United States Patent
Dembski et al.

(10) Patent No.: US 12,287,274 B2
(45) Date of Patent: Apr. 29, 2025

(54) FLUIDIC RESISTANCE UNITS, AS WELL AS FLOW CYTOMETERS AND METHODS INVOLVING THE SAME

(71) Applicant: BECTON, DICKINSON AND COMPANY, Franklin Lakes, NJ (US)

(72) Inventors: Kyle Dembski, Scotts Valley, CA (US); Pierce Norton, Los Gatos, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 181 days.

(21) Appl. No.: 18/203,500

(22) Filed: May 30, 2023

(65) Prior Publication Data

US 2023/0393047 A1 Dec. 7, 2023

Related U.S. Application Data

(60) Provisional application No. 63/349,367, filed on Jun. 6, 2022.

(51) Int. Cl.
| | |
|---|---|
| *G01N 15/1404* | (2024.01) |
| *G01N 15/01* | (2024.01) |
| *G01N 15/14* | (2024.01) |
| *G01N 15/1409* | (2024.01) |

(52) U.S. Cl.
CPC ..... *G01N 15/1404* (2013.01); *G01N 15/1459* (2013.01); *G01N 15/01* (2024.01); *G01N 15/1409* (2024.01); *G01N 2015/1461* (2013.01)

(58) Field of Classification Search
CPC ........... G01N 15/1404; G01N 15/1459; G01N 15/01; G01N 15/1409; G01N 2015/1461; G01N 2015/1006

USPC .......................................................... 356/246
See application file for complete search history.

(56) References Cited

U.S. PATENT DOCUMENTS

| | | | |
|---|---|---|---|
| 5,395,588 A | 3/1995 | North et al. | |
| 8,017,402 B2* | 9/2011 | Rich | .................... G05D 7/0682 |
| | | | 436/63 |
| 8,202,733 B1 | 6/2012 | Javadi | |
| 8,528,427 B2 | 9/2013 | Vrane et al. | |
| 11,726,027 B2* | 8/2023 | Dóra | .................. G01N 15/1404 |
| | | | 356/246 |
| 2012/0103112 A1 | 5/2012 | Vrane et al. | |
| 2018/0156711 A1 | 6/2018 | Vrane | |
| 2020/0056979 A1 | 2/2020 | Ghazi | |

* cited by examiner

*Primary Examiner* — Seung C Sohn

(74) *Attorney, Agent, or Firm* — Bret E. Field; BOZICEVIC, FIELD & FRANCIS LLP

(57) ABSTRACT

Fluidic resistance units are provided. Fluidic resistance units of interest include a plurality of valves and a plurality of resistors, where each resistor in the plurality of resistors is fluidically coupled to and co-located with a different valve in the plurality of valves. In one embodiment, fluidic resistance units include an inlet for receiving fluid, a valve line fluidically coupled to the inlet, a resistor line fluidically coupled to the inlet, a plurality of connectors fluidically coupling the valve line to the resistor line, and an outlet for emitting fluid. Valve lines of interest include a series of fluidically coupled valves, and resistor lines of interest include a series of fluidically coupled resistors. Methods and flow cytometers involving the subject fluidic resistance units are also provided.

20 Claims, 9 Drawing Sheets

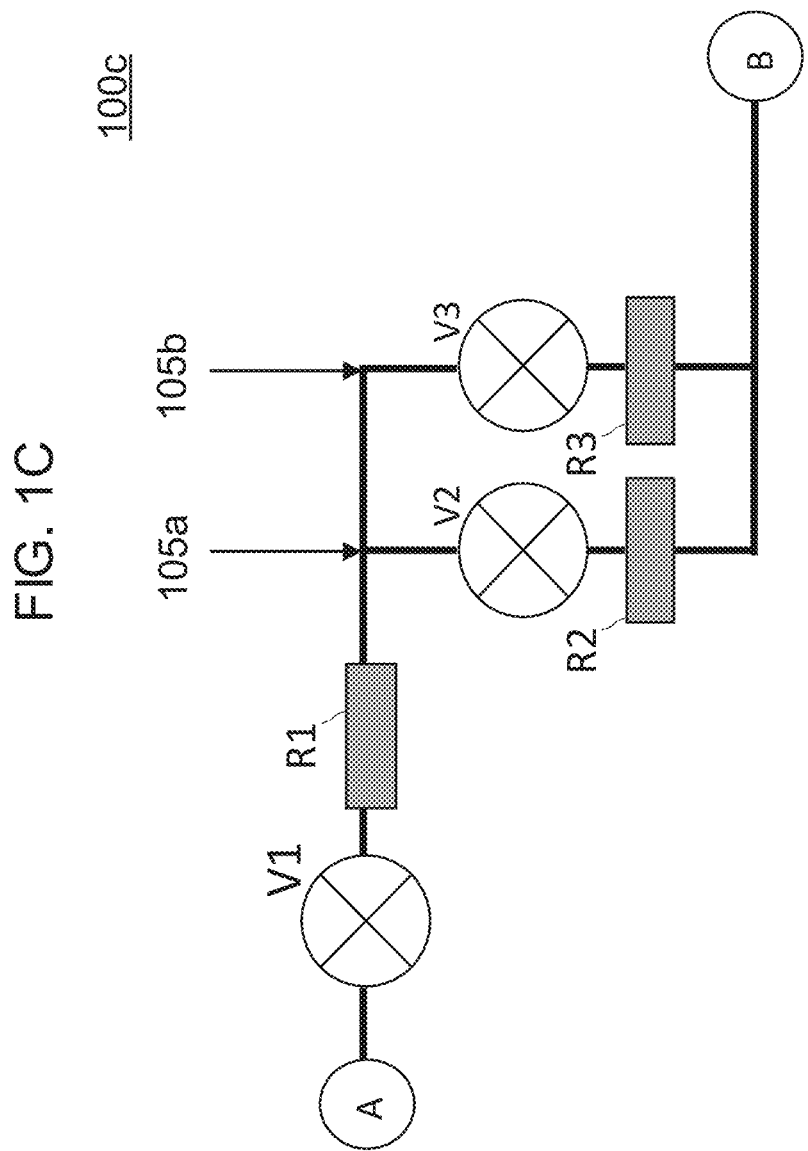

| R2 | 2" |
| --- | --- |
| R3 | 4" |
| R4 | 8" |
| R5 | 16" |
| Inner Diameter 0.030" | |

FLUIDIC RESISTANCE UNITS, AS WELL AS FLOW CYTOMETERS AND METHODS INVOLVING THE SAME

CROSS-REFERENCE TO RELATED APPLICATION

Pursuant to 35 U.S.C. § 119 (e), this application claims priority to the filing date of U.S. Provisional Patent Application Ser. No. 63/349,367 filed Jun. 6, 2022; the disclosure of which application is incorporated herein by reference in its entirety.

INTRODUCTION

Flow cytometry is a technique used to characterize and often times sort biological material, such as cells of a blood sample or particles of interest in another type of biological or chemical sample. A flow cytometer typically includes a sample reservoir for receiving a fluid sample, such as a blood sample, and a sheath reservoir containing a sheath fluid. The flow cytometer transports the particles (including cells) in the fluid sample as a cell stream to a flow cell, while also directing the sheath fluid to the flow cell. To characterize the components of the flow stream, the flow stream is irradiated with light. Variations in the materials in the flow stream, such as morphologies or the presence of fluorescent labels, may cause variations in the observed light and these variations allow for characterization and separation. To characterize the components in the flow stream, light must impinge on the flow stream and be collected. Light sources in flow cytometers can vary and may include one or more broad spectrum lamps, light emitting diodes as well as single wavelength lasers. The light source is aligned with the flow stream and an optical response from the illuminated particles is collected and quantified.

Some flow cytometer systems have been implemented using pressure-driven fluidics in which the sample and sheath fluid are provided to a flow cell, which contains the detection region, under a pressure greater than ambient pressure. Changes in the flow rate through the flow cell of a pressure-driven fluidics system are achieved by varying the pressure in the sample tube and/or the sheath fluid reservoir that feed into the flow cell. The ratio of sample fluid to sheath fluid flowing through the flow cell is governed both by the pressure levels in the sample tube and sheath fluid reservoir, and by the ratio of the resistances of the sample fluid and sheath fluid paths.

Alternatively, flow cytometer systems have been implemented using vacuum-driven fluidics in which a vacuum pump draws a vacuum downstream of the flow cell, and the sample and sheath fluids are held at ambient pressure. Changes in the flow rate through the flow cell of a vacuum-driven fluidics system are achieved by varying the vacuum drawn by the vacuum pump, and the ratio of sample fluid to sheath fluid flowing through the flow cell is governed by the ratio of the resistances of sample fluid and sheath fluid paths. Previous systems, such as those disclosed in U.S. Pat. No. 8,528,427 by Vrane et al., have employed fluidic resistors and valves to provide a limited number of sheath fluid resistance states.

SUMMARY

The present inventors have realized that, in order to further improve sample flow rate control in vacuum-driven fluidics systems, one must be able to vary the resistances with which fluid is drawn through the fluidics system to the flow cell. As such, systems and methods involving increased resistance states are desirable. Embodiments of the fluidic resistance units, flow cytometers and methods described herein satisfy this desire.

Aspects of the invention include fluidic resistance units. Fluidic resistance units include a plurality of valves and a plurality of resistors, where each resistor in the plurality of resistors is fluidically coupled to and co-located with a different valve in the plurality of valves. In embodiments, the subject fluidic resistance units include an inlet for receiving fluid, a valve line fluidically coupled to the inlet, a resistor line fluidically coupled to the inlet, a plurality of connectors fluidically coupling the valve line to the resistor line, and an outlet for emitting fluid. Valve lines of interest include a series of fluidically coupled valves, and resistor lines of interest include a series of fluidically coupled resistors. In some instances, the valve line comprises from 2 to 6 valves (e.g., 4 valves). The resistor line may, in certain cases, includes from 2 to 6 resistors (e.g., 4 resistors). In some embodiments, the fluidic resistance unit comprises an equal number of resistors and valves. In such embodiments, the fluidic resistance may include $x^2$ resistance states, where x is the number of valves. In select versions, each valve of the valve line is individually switchable between an open position in which passage of fluid through the valve is unobstructed and a closed position in which passage of fluid of the valve is obstructed. In the closed position, the passage of fluid through the valve is either partially or fully obstructed. In some cases, each resistor of the resistor line comprises an inner diameter ranging from 0.25 cm to 1.25 cm. In certain instances, the inner diameters of the resistors of the resistor line either successively increase or are constant. In select embodiments, each resistor of the resistor line has a length ranging from 1.5 cm to 90 cm. The lengths of the resistors in the resistor line may, in some cases, successively increase. The number of connectors in the plurality of connectors may range, for example, from 2 to 5 (e.g., 3). In select instances, each connector in the plurality of connectors fluidically couples a portion of the valve line located between two valves in the series of valves to a portion of the resistor line located between two resistors in the series of resistors. The fluidic resistance unit may be comprised of, for example, plastic or metal tubing.

Aspects of the invention also include flow cytometers. Flow cytometers of interest include a flow cell for transporting particles in a flow stream, a sheath fluid line for fluidically coupling to a sheath fluid reservoir, and a fluidic resistance unit positioned between the sheath fluid line and the flow cell. Fluidic resistance units for use in the subject flow cytometers are described above and include an inlet fluidically coupled to the sheath fluid line, a valve line fluidically coupled to the inlet, a resistor line fluidically coupled to the inlet, a plurality of connectors fluidically coupling the valve line to the resistor line, and an outlet fluidically coupling the fluidic resistance unit to the flow cell. As discussed above, valve lines of interest include a series of fluidically coupled valves, and resistor lines of interest include a series of fluidically coupled resistors. In some instances, flow cytometers include a processor operably connected to each valve of the valve line. The processor may, in such instances, be configured to change a resistance state of the fluidic resistance unit by initiating the switching of a valve in the valve line from an open state to a closed state, or vice versa. In select versions, flow cytometers include a light source configured to irradiate the flow cell at an interrogation point, a detector configured to collect particle-modulated light from the flow cell, and a sheath fluid reservoir.

Additional aspects of the invention include methods of analyzing a sample. Methods of interest include (a) introducing a particulate sample into a flow cytometer having a flow cell for transporting particles in a flow stream, a sheath fluid line for fluidically coupling to a sheath fluid reservoir, and a fluidic resistance unit positioned between the sheath fluid line and the flow cell, and (b) flow cytometrically analyzing the sample. Fluidic resistance units for use in the subject methods include an inlet fluidically coupled to the sheath fluid line, a valve line fluidically coupled to the inlet, a resistor line fluidically coupled to the inlet, a plurality of connectors fluidically coupling the valve line to the resistor line, and an outlet fluidically coupling the fluidic resistance unit to the flow cell. As discussed above, valve lines of interest include a series of fluidically coupled valves, and resistor lines of interest include a series of fluidically coupled resistors. Embodiments of the methods include changing a resistance state of the fluidic resistance unit by switching a valve of the valve line from an open state to a closed state, or vice versa. In certain cases, particulate samples of interest include biological samples, such as cells.

Elements of the invention further include methods of assembling a flow cytometer. Methods of interest include fluidically coupling a fluidic resistance unit to a flow cell for transporting particles in a flow stream, and a sheath fluid line for fluidically coupling to a sheath fluid reservoir. Fluidic resistance units for use in the subject methods include an inlet fluidically coupled to the sheath fluid line, a valve line fluidically coupled to the inlet, a resistor line fluidically coupled to the inlet, a plurality of connectors fluidically coupling the valve line to the resistor line, and an outlet fluidically coupling the fluidic resistance unit to the flow cell. As discussed above, valve lines of interest include a series of fluidically coupled valves, and resistor lines of interest include a series of fluidically coupled resistors. Methods according to some embodiments include operably connecting a processor to each valve of the valve line. As discussed above, processors of interest may be configured to change a resistance state of the fluidic resistance unit by initiating the switching of a valve in the valve line from an open state to a closed state, or vice versa.

BRIEF DESCRIPTION OF THE FIGURES

The invention may be best understood from the following detailed description when read in conjunction with the accompanying drawings. Included in the drawings are the following figures:

FIG. 1A-1C depict fluidic resistance units according to certain embodiments of the invention.

DETAILED DESCRIPTION

Figure 1A:
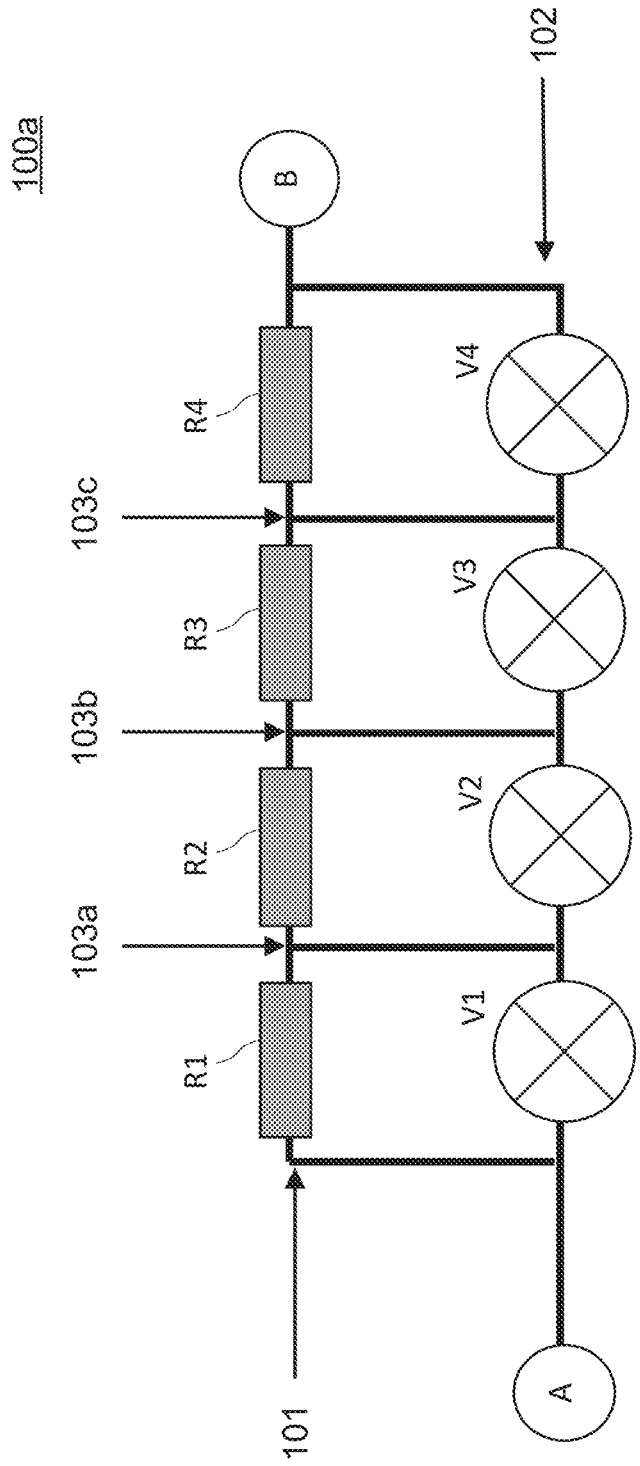

Fluidic resistance units are provided. Fluidic resistance units of interest include a plurality of valves and a plurality of resistors, where each resistor in the plurality of resistors is fluidically coupled to and co-located with a different valve in the plurality of valves. In one embodiment, fluidic resistance units include an inlet for receiving fluid, a valve line fluidically coupled to the inlet, a resistor line fluidically coupled to the inlet, a plurality of connectors fluidically coupling the valve line to the resistor line, and an outlet for emitting fluid. Valve lines of interest include a series of fluidically coupled valves, and resistor lines of interest include a series of fluidically coupled resistors. Methods and flow cytometers involving the subject fluidic resistance units are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the system and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

Fluidic Resistance Units

As discussed above, aspects of the invention include fluidic resistance units. By "fluidic resistance unit", it is meant a device configured to provide an amount of resistance to fluid that is being transported therethrough (e.g., using pressure or a vacuum). For example, where the subject fluidic resistance units are employed in a flow cytometer (although other applications may be envisioned by one of ordinary skill in the art), the relative proportion of sheath fluid and sample fluid drawn through the flow cell may be modulated by employing a certain resistance. As the total flow rate through the flow cell is held constant, modulation of the relative proportion of sheath fluid and sample fluid drawn through the flow cell also controls the sample fluid flow rate through the flow cell. In some cases, the subject fluidic resistance units increase the number of resistance states that may be applied to fluid flow, e.g., relative to conventional devices for providing fluidic resistance. By "resistance state" is meant a particular level of resistance associated with a fluidic resistance unit that is applied at a given time during fluid flow. In some cases, the fluidic resistance units of the disclosure increase the number of resistance states by twofold or more, by threefold or more, by fourfold or more and including by fivefold or more. The increased number of resistance states increases the precision with which fluid flow rates may be controlled. The resistance states may be discrete or continuous. In some embodiments, the resistance states are discrete. In other embodiments, the resistance states are continuous.

The fluidic resistance units may be comprised of any convenient material. In some cases, fluidic resistance units include conduits (e.g., tubing). In such cases, the tubing may be comprised of, for example, glass, plastic, or steel, as well as combinations thereof. The tubing may have any convenient inner diameter, where diameters of interest range from 0.025 cm to 1.25 cm, such as 0.05 cm to 0.50 cm and included 0.05 to 0.50 cm. Inner diameters of the conduit may be constant throughout the fluidic resistance units or may vary, as desired. In embodiments, fluidic resistance units include an inlet for receiving liquid and an outlet for emitting liquid. Any convenient inlet may be employed. For example, the inlet may be a portal in a conduit through which fluid may enter. In certain versions, the inlet is or includes a fluidic fitting that is configured to couple to, e.g., a sheath fluid line. Similarly, and convenient outlet may be employed. In some embodiments, the outlet is configured to fluidically couple with a flow cell, e.g., via a fitting.

Aspects of the fluidic resistance units include a plurality of valves. Any valves suitable for fluidic applications may be employed including, but not limited to, needle valves, globe valves, gate valves, plug valves, ball valves, butterfly valves, pinch valves, angle valves, cock valves (e.g., stopcock valves), and the like. Each valve in the plurality of valves may either be the same type of valve or different. In some cases, each valve in the plurality of valves is the same type of valve. In other cases, one or more of the valves in the plurality of valves is a different type of valve with respect to another valve in the plurality of valves. The number of valves in the plurality of valves may vary, as desired. In some embodiments, the number of valves in the plurality of valves ranges from 2 to 10, such as 2 to 8, such as 2 to 6, and including 2 to 4. In some embodiments, the plurality of valves includes 4 valves.

Aspects of the fluidic resistance units also include a plurality of resistors. The resistors described herein are configured to restrict fluid flow any may take any convenient form. In some embodiments of the invention, the fluidic resistance units are configured to provide a plurality of discrete resistance levels. This is achieved by providing alternative selectable fluid paths, each fluidic path having a different fluidic resistance. In such embodiments, each discrete path may constitute or comprise a distinct resistor in the plurality of resistors. The fluid paths may be a conduits (e.g., lengths of tubing) having different lengths or inner diameters. Valves may be situated in the fluid paths to allow selection of a desired fluid path from among the plurality of alternative fluid paths.

In certain cases, the fluidic resistance units include viscously dominated restrictors. In embodiments, a viscously dominated restrictor is achieved by using a length of tubing or similar conduit having an essentially constant internal diameter. Such resistors may be characterized as having a discrete resistance level. The resistive force, for a fluid of a given viscosity, depends on the length and internal cross-sectional area of the conduit, and the length is selected to provide the desired resistance. In contrast, simply pinching a tubing at a single point, or using a valve (such as a needle valve) to provide a flow restriction, results in a convective acceleration. Due to the effects of temperature on viscosity, the temperature dependence of the resistance of the sheath fluid line incorporating the viscously dominated fluidic resistor is the same as the temperature dependence of the resistance of the sample fluid line. Thus, the ratio of the sample fluid line and sheath fluid line resistances remains the same as the temperature is varied. In contrast, as pinching is convectively dominated and the resistance is not a function of temperature, the use of a pinching-type resistance would result in a change in the ratio of the path resistances with a change in temperature.

In alternative embodiments of the invention, the fluidic resistance units are continuously variable. In some such embodiments, at least one resistor includes a conduit composed of an at least partially compressible or deformable material, such as length of plastic tubing, and an adjustable pressure is applied to the outside of the tubing. Modulation of the pressure applied to the outside of the tubing changes alters the diameter and/or shape of the tubing, thereby changing the cross-sectional area of the fluidic path and, concomitantly, changing the fluidic resistance of the tubing. The continuously variable resistor may consist of a length of tubing that is compressed mechanically. For example, the tubing may be wound around a cylindrical post and compressed between plates, at least one movable, having surfaces perpendicular to the post. Alternatively, the continuously variable resistor may consist of a length of tubing that passes through the interior of a pressure chamber having an adjustable internal pressure. The internal pressure of the pressure chamber may be modulated by connecting the chamber to adjustable pressure source, such as a compressed air source, or by altering the size and/or shape of the pressure chamber, such as by mechanical means.

Each resistor in the plurality of resistors may either be the same type of resistor or different. In some cases, each resistor in the plurality of valves is the same type of resistor. In other cases, one or more of the resistors in the plurality of resistors is a different type of resistor with respect to another resistor in the plurality of resistors. In some such cases, one or more resistors in the plurality or resistors is continuously variable (i.e., may provide a range of resistances) while one or more other resistors is discrete. The number of resistors in the plurality of resistors may vary, as desired. In some embodiments, the number of resistors in the plurality of resistors ranges from 2 to 10, such as 2 to 8, such as 2 to 6, and including 2 to 4. In some embodiments, the plurality of resistors includes 4 resistors. Each resistor may have any convenient length. In some embodiments, each resistor has a length ranging from 1.5 cm to 90 cm, such as 1.5 cm to 50 cm, and including 1.5 cm to 45 cm. In some cases, at least one resistor has a length ranging from 35 cm to 45 cm, such as 40.64 cm. In some cases, at least one resistor has a length ranging from 15 cm to 25 cm, such as 20.32 cm. In some cases, at least one resistor has a length ranging from 5 cm to 15 cm, such as 10.16 cm. In some cases, at least one resistor has a length ranging from 1 cm to 10 cm, such as 5.08 cm. Where resistors include lengths of conduit (e.g., tubing), the tubing may be arranged in any convenient manner. In some cases, the tubing may be wound around a cylindrical post, e.g., in a coil. In some such cases, the tubing may be compressed between movable plates having surfaces perpendicular to the post. However, any other suitable arrangement (e.g., that does not create unintentional kinks in the tubing) may likewise be employed.

Each resistor in the plurality of resistors may either apply the same level of resistance or apply a different level of resistance. In some instances, all of the resistors apply the same level of resistance relative to each other. In some such instances, each resistor may be characterized by the same internal diameter and length, i.e., the internal diameter and length are held constant. In other embodiments, each resistor in the plurality of resistors applies a different level of resistance relative to each other. In certain cases, the resistances of the plurality of resistors successively increase. In other words, the plurality of resistors includes a resistor characterized by a lowest resistance, a resistor characterized by an incrementally higher resistance compared to the lowest resistance, resistor characterized by a resistance that is incrementally higher than the previous, and so on. In some such embodiments, the internal diameter and/or length of the resistors may be varied. In certain embodiments, the inner diameters of the resistors successively increase. In additional embodiments, the lengths of the resistors successively increase. In further embodiments, the inner diameters of the resistors are constant while the lengths of the resistors successively increase.

In certain cases, each resistor in the plurality of resistors is fluidically coupled to and co-located with a different valve in the plurality of valves. As discussed herein, two entities may be described as "fluidically coupled" if they have a conduit positioned therebetween configured to convey liquid from one entity to the other. Similarly, two entities may be described as "co-located" if they are located adjacently and/or in close proximity with respect to one another within the fluidic resistance unit. For example, if entity A and entity B are fluidically coupled to one another via one or more conduits and there are no intervening entities within or along those conduits, entities A and B may be described as co-located. As such, in certain instances, each resistor may be fluidically coupled and co-located with a valve such that the open or closed status of the valve influences if and/or how fluid passes through the co-located resistor. In select versions, the fluidic resistance unit does not include a valve that is not co-located and/or fluidically connected to a particular resistor. In these embodiments, the fluidic resistance unit comprises an equal number of resistors and valves.

In select cases, each valve in the plurality of valves is individually switchable between an open position in which passage of fluid through the valve is unobstructed and a closed position in which passage of fluid of the valve is obstructed. Passage of fluid through each valve may either be partially or fully obstructed in the closed position. In some cases where the valves are fully obstructed in the closed position, the fluidic resistance unit is configured to provide discrete resistance levels. In these cases, the valve may select the resistor(s) through which fluid will pass and thereby achieve different resistance states. In some other cases where the valves are partially obstructed in the closed position, the fluidic resistance unit is configured to provide continuous resistance levels. The valves may include any convenient mechanism for switching between an open and closed position. In certain cases, the valves are under automated control, e.g., using servomechanisms.

The components of the subject fluidic resistance units may be arranged in any suitable configuration. Exemplary configurations include a series configuration, a parallel configuration, and a configuration that includes both series and parallel elements. In some instances, the fluidic resistance unit includes a series configuration. In some such embodiments, the fluidic resistance unit includes an inlet for receiving fluid, a valve line fluidically coupled to the inlet and a resistor line fluidically coupled to the inlet. Any convenient inlet may be employed. As discussed herein, a "valve line" refers to a plurality (i.e., a series) of valves that are fluidically coupled to one another, e.g., via conduits. Similarly, a "resistor line" refers to a plurality (i.e., a series) of resistors that are fluidically coupled to one another, e.g., via conduits. Embodiments of the fluidic resistance unit also include a plurality of connectors fluidically coupling the valve line to the resistor line. The "connectors" described herein are conduits that join a portion of the valve line to a portion of the resistor line. In some instances, each connector in the plurality of connectors fluidically couples a portion of the valve line located between two valves in the series of valves to a portion of the resistor line located between two resistors in the series of resistors. Any convenient number of connectors may be employed. The number of connectors in the plurality of connectors may vary, as desired. In some embodiments, the number of connectors in the plurality of connectors ranges from 2 to 10, such as 2 to 8, such as 2 to 5, and including 2 to 4. In some embodiments, the plurality of connectors includes 3 connectors. In certain cases, the plurality of connectors includes n−1 connectors, where n is the number of resistors and/or valves.

In some embodiments involving the series configuration, each valve of the valve line is individually switchable (e.g., via a servomechanism) between an open position in which passage of fluid through the valve is unobstructed and a closed position in which passage of fluid of the valve is obstructed, e.g., where the obstruction may be full or partial. In this manner, the resistors through which fluid passes can be adjusted. The resistances of the resistors in the resistor line may, in some embodiments, successively increase. In some cases, each resistor of the resistor line comprises an inner diameter ranging from 0.025 to 1.25 cm, such as 0.050 to cm and include 0.050 to 0.10 cm. In select instances, the inner diameters of the resistors in the resistor line successively increase. In other instances, the inner diameters of the resistors in the resistor line are constant. In certain versions, each resistor of the resistor line has a length ranging from 1.5 cm to 90 cm. In select cases, the lengths of the resistors in the resistor line successively increase. In some embodiments involving the series configuration, the fluidic resistance unit comprises an equal number of resistors and valves. In some such embodiments, the fluidic resistance unit comprises $x^2$ resistance states, where x is the number of valves. In an exemplary embodiment including 4 valves in series, the fluidic resistance unit includes 16 resistance states.

In one example involving the series configuration, fluid may enter through the inlet and subsequently branch off into the resistor line and the valve line (e.g., via a Y connector). If each valve in the valve line is closed, then fluid would pass through each resistor in the resistor line before reaching the outlet. This scenario constitutes the highest resistance state. If the valve in the valve line nearest the inlet is open, an amount of fluid can bypass the first resistor. Since the next valve in the valve line is closed, the bypassed fluid would enter the resistor line via a connector and pass through the remaining resistors. This would result in a resistance state that is incrementally lower than the one where each valve is closed. In this manner, any combination of open and closed valves creates a different resistance state.

FIG. 1A depicts a fluidic resistance unit 100a having a series configuration according to certain embodiments of the invention. Fluidic resistance unit 100a includes an inlet A, a plurality of resistors R1-R4 in a resistor line 101, valves V1-V4 in valve line 102, connectors 103a-103c, and an outlet B. Since fluidic resistance unit 100a includes 4 valves, it is characterized by $4^2$=16 resistance states. If all of V1-V4 are closed, fluid entering at inlet A must pass through each of R1-R4 and would therefore encounter the highest level of resistance. If valve V1 is open and valves V2-V4 are closed, some amount of fluid that would have otherwise passed through R1 passes through V1 and connector 103a before passing through valves R2-R4. If valve V3 is open while valves V1-V2 and V4 are closed, some amount of fluid that otherwise would have passed through R3 passes through V3 and returns to the resistor line 103c. In this manner, any of 16 combinations of open and closed valves may be achieved, thereby producing 16 resistance states.

In some cases, the fluidic resistance unit is characterized by a parallel configuration. In such embodiments, the fluidic resistance unit includes an inlet for receiving fluid, a plurality of fluidic lines running in parallel, and an outlet for emitting fluid. Each of the fluidic lines contains both a valve and a resistor. A portion of each fluidic line that is closer to the inlet includes a valve, while a portion of each fluidic line closer to the outlet includes a resistor. In some embodiments, there are no fluidic lines in parallel that include a valve but no resistor, or a resistor and no valve. In other words, each parallel fluidic line includes both a valve and a resistor. In some cases, the fluidic resistance unit in parallel includes an equal number of resistors and valves.

Figure 1B:
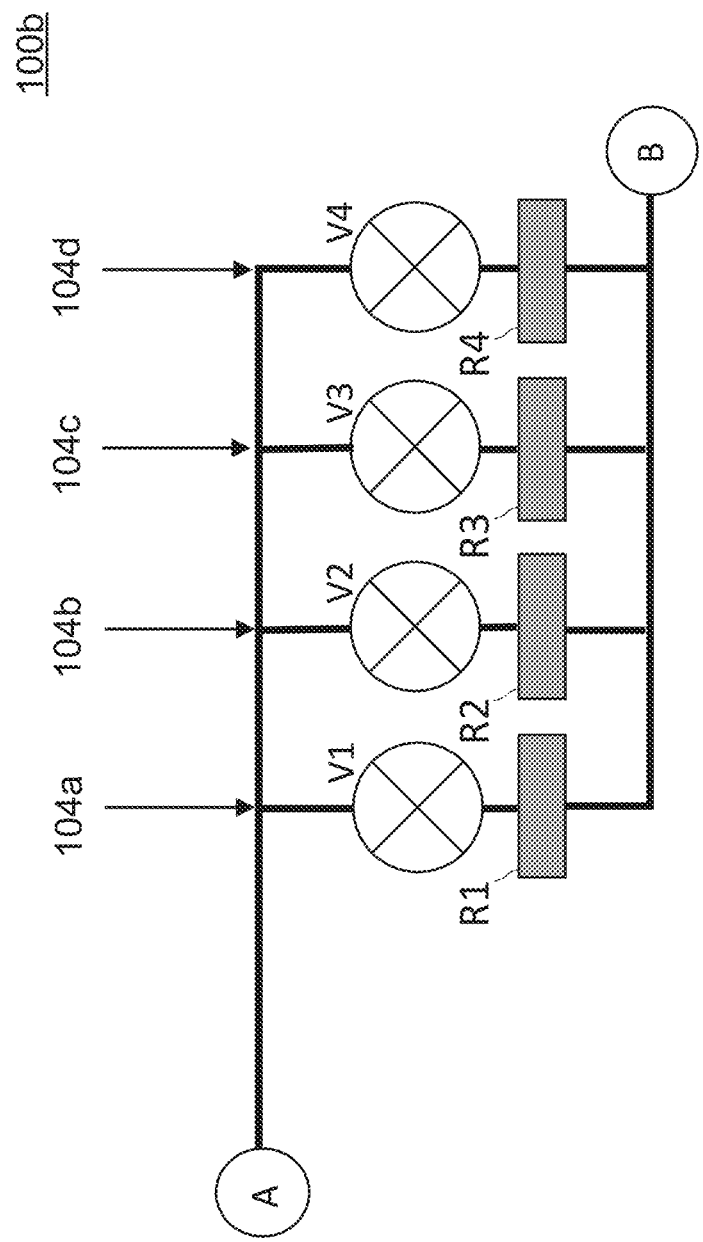

FIG. 1B depicts a fluidic resistance unit 100b having a parallel configuration according to certain embodiments of the invention. Fluidic resistance unit 100b includes an inlet A, a plurality of valves V1-V4, a plurality of resistors R1-R4, parallel fluidic lines 104a-104d, and an outlet B. Valve V1 is fluidically coupled and co-located with resistor R1 on fluidic line 104a, Valve V2 is fluidically coupled and co-located with resistor R2 on fluidic line 104b, Valve V3 is fluidically coupled and co-located with resistor R3 on fluidic line 104c, and Valve V4 is fluidically coupled and co-located with resistor R4 on fluidic line 104d. In the embodiment of FIG. 1B, each of resistors R1-R4 is characterized by a different level of resistance (e.g., they have successively increasing lengths, although this is not shown). Therefore, depending on which of valves V1-V4 is open or closed at a given time, different resistance states may be achieved.

In certain cases, fluidic resistance units are characterized by a configuration that involves both arrangements in parallel and in series. In these cases, at least two sets of valves and resistors are positioned within parallel fluidic lines (e.g., as depicted and described with respect to FIG. 1B). In addition, at least one resistor-valve pair is located upstream and/or downstream of the parallel fluidic lines, where "upstream" and "downstream" are defined with respect to the direction of fluid flow. In other words, the resistor-valve pair is "in series" with the resistor-valve pairs that are "in parallel".

FIG. 1C depicts a fluidic resistance unit 100c characterized by a configuration that involves both arrangements in parallel and in series according to certain embodiments of the invention. Fluidic resistance unit 100c includes inlet A, valves V1-V3, resistors R1-R3, parallel fluidic lines 105a-105b and outlet B. Valve V2 is fluidically coupled and co-located with resistor R2 on fluidic line 105a, Valve V3 is fluidically coupled and co-located with resistor R3 on fluidic line 105b. Valve V1 and resistor R1 are co-located and fluidically coupled with one another and are positioned upstream of fluidic lines 105a-105b. Although not shown in FIG. 1C, valve V1 may optionally be fluidically coupled to a conduit that bypasses resistor R1. Valve V1 may be configured to divert fluid to such a conduit in the event that it is desirable to have a lower resistance state.

Flow Cytometers

Aspects of the invention also include flow cytometers. Flow cytometers of interest include a flow cell for transporting particles in a flow stream, a sheath fluid line for fluidically coupling to a sheath fluid reservoir, and a fluidic resistance unit positioned between the sheath fluid line and the flow cell. As discussed above, fluidic resistance units of the invention include a plurality of valves as well as a plurality of resistors, where each resistor in the plurality of resistors is fluidically coupled to and co-located with a different valve in the plurality of valves. In some cases, fluidic resistance units of the invention include an inlet fluidically coupled to the sheath fluid line, a valve line fluidically coupled to the inlet, a resistor line fluidically coupled to the inlet, a plurality of connectors fluidically coupling the valve line to the resistor line, and an outlet fluidically coupling the fluidic resistance unit to the flow cell.

As discussed herein, the "flow cell" is described in its conventional sense to refer to a component containing a flow channel having a liquid flow stream for transporting particles in a sheath fluid. In embodiments, the subject flow cell includes a cuvette. Cuvettes of interest include containers having a passage running therethrough. The flow stream may include a liquid sample injected from a sample tube. Flow cells of interest include a light-accessible flow channel. In some instances, the flow cell includes transparent material (e.g., quartz) that permits the passage of light therethrough. Any convenient flow cell which propagates a fluidic sample to a sample interrogation region may be employed as the flow cell described herein, where in some embodiments, the flow cell includes is a cylindrical flow cell, a frustoconical flow cell or a flow cell that includes a proximal cylindrical portion defining a longitudinal axis and a distal frustoconical portion which terminates in a flat surface having the orifice that is transverse to the longitudinal axis.

In certain embodiments, the flow cytometer includes a sample fluid source. The sample fluid source may be any suitable reservoir or container (e.g., having rigid or flexible walls) for holding a sample fluid. The sample fluid container may have a volume ranging from 1 mL to 100 mL; for example, the volume of the container may range from 1 mL to 90 mL, from 1 mL to 80 mL, from 1 mL to 70 mL, from 1 mL to 60 mL, from 1 mL to 50 mL, from 1 mL to 40 mL, from 1 mL to 30 mL, from 1 mL to 20 mL, or from 1 mL to 10 mL.

In some embodiments, the flow cytometer includes a sheath fluid reservoir. The sheath fluid reservoir many be any suitable reservoir or container (e.g., having rigid or flexible walls) for holding sheath fluid. In certain embodiments, the sheath fluid reservoir is fluidically coupled to the input of the flow cell. The sheath fluid container may have a volume ranging from 1 L to 100 L; for example, the volume of the container may range from 1 L to 90 L, from 1 L to 80 L, from 1 L to 70 L, from 1 L to 60 L, from 1 L to 50 L, from 1 L to 40 L, from 1 L to 30 L, from 1 L to 20 L, or from 1 L to 10 L. The sheath fluid reservoir may be fluidically connected to a sheath fluid line that is configured to convey sheath fluid from the reservoir to the flow cell.

In some embodiments, the flow cell includes a sample injection port configured to provide a sample from the sample fluid source to the flow cell. The sample injection port may be an orifice positioned in a wall of the inner chamber or may be a conduit positioned at the proximal end of the inner chamber. Where the sample injection port is an orifice positioned in a wall of the inner chamber, the sample injection port orifice may be any suitable shape where cross-sectional shapes of interest include, but are not limited to rectilinear cross-sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. In certain embodiments, the sample injection port has a circular orifice. The size of the sample injection port orifice may vary depending on shape, in certain instances, having an opening ranging from 0.1 mm to 5.0 mm, such as 0.2 to 3.0 mm, such as 0.5 mm to 2.5 mm, such as from 0.75 mm to 2.25 mm, such as from 1 mm to 2 mm and including from 1.25 mm to 1.75 mm, for example 1.5 mm.

In certain instances, the sample injection port is a conduit positioned at a proximal end of the flow cell inner chamber. For example, the sample injection port may be a conduit positioned to have the orifice of the sample injection port in line with the flow cell orifice. Where the sample injection port is a conduit positioned in line with the flow cell orifice, the cross-sectional shape of the sample injection tube may be any suitable shape where cross-sectional shapes of interest include, but are not limited to: rectilinear cross-sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The orifice of the conduit may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm. The shape of the tip of the sample injection port may be the same or different from the cross-sectional shape of the sample injection tube. For example, the orifice of the sample injection port may include a beveled tip having a bevel angle ranging from 1 degree to 10 degrees, such as from 2 degrees to 9 degrees, such as from 3 degrees to 8 degrees, such as from 4 degrees to 7 degrees and including a bevel angle of 5 degrees.

In some embodiments, the flow cell also includes a sheath fluid injection port configured to provide a sheath fluid from the sheath fluid source to the flow cell. In embodiments, the sheath fluid injection system is configured to provide a flow of sheath fluid to the flow cell inner chamber, for example in conjunction with the sample to produce a laminated flow stream of sheath fluid surrounding the sample flow stream. Depending on the desired characteristics of the flow stream, the rate of sheath fluid conveyed to the flow cell chamber may be 25 µL/sec to 2500 µL/sec, such as 50 µL/sec to 1000 µL/sec, and including 75 µL/sec or more to 750 µL/sec.

In some embodiments, the sheath fluid injection port is an orifice positioned in a wall of the inner chamber. The sheath fluid injection port orifice may be any suitable shape where cross-sectional shapes of interest include, but are not limited to rectilinear cross-sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

Flow cytometers of the invention include a fluidic resistance unit positioned between the sheath fluid reservoir and the flow cell (e.g., a sheath fluid injection port of the flow cell). For example, where the sheath fluid reservoir includes a sheath fluid line fluidically coupled thereto, the inlet of fluidic resistance unit may be fluidically coupled to the sheath fluid line (e.g., via a fitting). Similarly, the outlet of the fluidic resistance unit may be coupled to the sheath fluid injection port of the flow cell (e.g., via a fitting). Any fluidic resistance unit, such as those described above, may be employed in the flow cytometer. In some embodiments, the fluidic resistance unit is in series. In other embodiments, the fluidic resistance unit is in parallel. In still other embodiments, the fluidic resistance unit includes both parallel and series elements.

In some embodiments, systems further include a pump (e.g., a vacuum pump) in fluid communication with the flow cell to propagate the flow stream through the flow cell. Any convenient fluid pump protocol may be employed to control the flow of the flow stream through the flow cell. In certain instances, systems include a peristaltic pump, such as a peristaltic pump having a pulse damper. The pump in the subject systems is configured to convey fluid through the flow cell at a rate suitable for multi-photon counting of light from the sample in the flow stream. For example, the system may include a pump that is configured to flow sample through the flow cell at a rate that ranges from 1 nL/min to 500 nL/min, such as from 1 nL/min to 250 nL/min, such as from 1 nL/min to 100 nL/min, such as from 2 nL/min to 90 nL/min, such as from 3 nL/min to 80 nL/min, such as from 4 nL/min to 70 nL/min, such as from 5 nL/min to 60 nL/min and including from 10 nL/min to 50 nL/min. In certain embodiments, the flow rate of the flow stream is from 5 nL/min to 6 nL/min.

Figure 2:
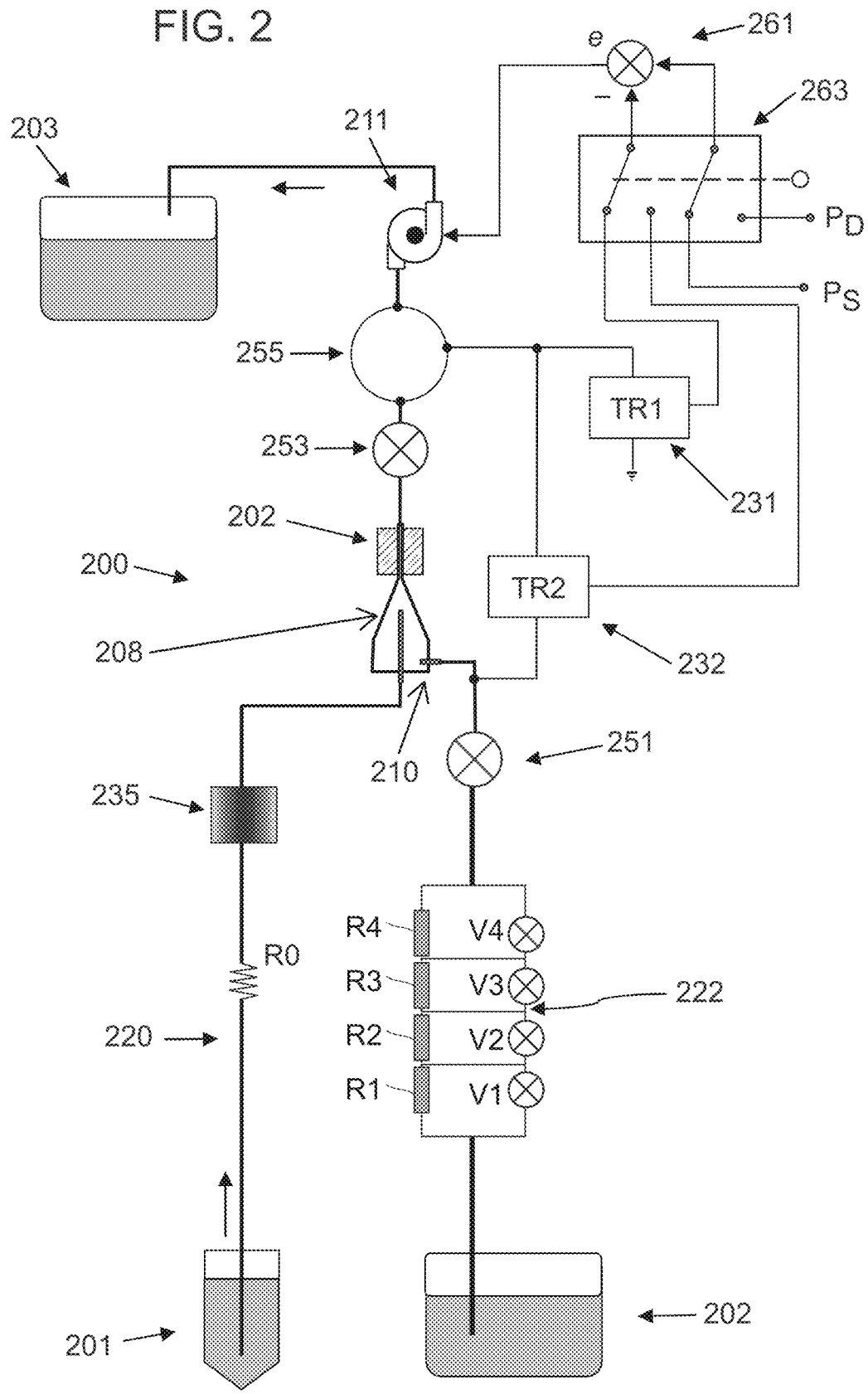
FIG. 2 depicts a fluidic system having a fluidic resistance unit according to certain embodiments of the invention.

FIG. 2 depicts a schematic representation of elements of a flow cytometric system of the present invention. A system vacuum is developed by a vacuum pump 211, which draws sheath fluid from the sheath reservoir 202 and sample fluid containing the particles to be analyzed from the sample tube 201 through flow cell 200, wherein optical analysis is carried out (optics not shown). Waste effluent, which is the mixture of sample and sheath fluids exiting the flow cell, is discharged into waste reservoir 203.

Pulsations in the vacuum developed by vacuum pump 211, which typically is a diaphragm-type pump, are attenuated by accumulator 255, also referred to as a pulsation damper. The accumulator can be a sealed canister with an internal volume many times (e.g., 10 to 1000 times) the stroke volume of the vacuum pump.

Transducer 231 measures the pressure drop developed by vacuum pump 211 relative to atmospheric pressure. This pressure drop is referred to herein as the "static pressure drop". The static pressure drop may be measured from the interior of accumulator 255 so that a stable measurement is obtained. Transducer 231 typically is connected to accumulator 255 by a short tube, such that the pressure in the tube equals the pressure in the accumulator. It is desirable to include an air bleed (e.g., a small orifice connecting the interior of the tube to the outside air) in the tube connecting transducer 231 and accumulator 255, positioned near the transducer, to allow a small amount of air to be drawn into and through the tube, drawn by the vacuum in the accumulator. The air bleed should be small enough such that the flow of air through the tube has an insignificant effect on the measurement of the static pressure drop. The minor air flow through the tube in the direction from the orifice (near the transducer) towards the accumulator prevents any fluid or foam that may be present in the accumulator from entering the tube to the transducer, which could affect the accuracy of the measurement.

Transducer 232 measures the pressure drop across the cuvette 102 (measured from upstream of the flow cell to the accumulator 255). This pressure drop is referred to herein as the "dynamic pressure drop". For a given total flow rate through the cuvette, the dynamic pressure drop is constant. Thus, by modulating the power of the vacuum pump 211 to provide a constant dynamic pressure drop, a constant total flow rate through the cuvette can be maintained.

Sample fluid is drawn through sample line 220 and into flow cell 200 through a sample inlet port 208. This entire sample path has a fluid resistance R0. Sheath fluid is drawn through a fluidic resistance unit 222 and into flow cell 200 through a sheath inlet port 210. In an embodiment, the fluidic resistance of the fluidic resistance unit is adjustable to multiple, discrete fluidic resistance settings. In another embodiment, the fluidic resistance of the fluidic resistance unit is continuously adjustable over a predefined range.

The relative proportions of sample fluid and sheath fluid that are drawn into flow cell 100 depend on the ratio of the sample line fluidic resistance R0 and the fluidic resistance of the fluidic resistance unit 222. Thus, by modulating the fluidic resistance of the fluidic resistance unit 222, the ratio of sample fluid to sheath fluid can be controlled. If the total flow rate through the flow cell is held constant by maintaining a constant dynamic pressure drop, each reduction of the effective fluidic resistance of fluidic resistance unit 222 results in a decrease in the sample fluid flow rate and an increase in the sheath fluid flow rate. Thus, a desired sample flow rate can be selected by an appropriate modulation of the total fluidic resistance of the fluidic resistance unit 222, while maintaining a constant flow rate through the flow cell.

Valve 253 enables shutting off the fluid flow through the flow cell completely. The flow may be paused to allow, for example, a change to a new sample source after each sample analysis. In the present system, the flow of fluid may be paused by closing a valve situated in the fluid path between the flow cell and the pump. When this valve is closed, the dynamic pressure drop drops to zero, the first feedback loop, which is between the dynamic pressure drop and the pump, is stopped, and the second feedback loop, which is between the static pressure drop and the pump, is activated. The second feedback loop enables maintaining the static pressure drop at a constant level during the paused state, such as maintaining the static pressure drop of the system that existed while in the running state prior to pausing the system (while under control of first feedback loop). When the flow of fluid through the flow cell is restarted, control of the pump is switched back to the first feedback loop, which enables maintaining a constant flow across the flow cell even after changes in the sample flow rate. This switching between feedback control circuits eliminates large fluctuations in the vacuum during transitions between running and paused states, while maintaining a constant flow rate through the flow cell for all samples.

Valve 251 enables shutting off the sheath fluid flow completely. Valve 251 is used to temporarily stop the sheath fluid flow and temporarily increase ("boost") the sample fluid flow rate following connection of the sample tube 201 to the sample line 220, in order to shorten the time it takes to draw sample fluid to the flow cell 200. When the sample fluid reaches the flow cell, valve 251 is opened, the flow of sheath fluid establishes a hydrodynamically focused stream, and the sample and sheath fluid flow rates return to the desired rates for analysis. Valves 251 and 253 mayl be under automatic control in a coordinated manner, such that valve 253 can be opened for a predetermined time prior to opening valve 251 in order to permit a vacuum to be developed in said flow cell before opening said valve 251.

Controller 261 with switching mechanism 263 controls the switching between the modulation of the power of vacuum pump 211 to provide a constant dynamic pressure drop and modulation of the power of vacuum pump 211 to provide a constant static pressure drop. To maintain a constant dynamic pressure drop, the controller compares the dynamic pressure drop measured by transducer 232 to a stored desired dynamic pressure drop $P_D$. The desired dynamic pressure drop $P_D$ is determined during instrument setup as the dynamic pressure drop that provides the desired flow rate through the flow cell. To maintain a constant static pressure drop, the controller compares the dynamic pressure drop measured by transducer 231 to a stored desired static pressure drop $P_S$. The desired static pressure drop $P_S$ is the measured static pressure drop that corresponds to the instrument running with the desired flow rate through the flow cell, which depends on the selected setting of the fluidic resistance unit. Multiple values for the desired static pressure drop $P_S$ may be stored, each corresponding to a predefined resistance setting of the fluidic resistance unit. Alternatively, the desired static pressure drop $P_S$ may be stored immediately before pausing the system, and the system restarted with the same resistance setting of the fluidic resistance unit that was in effect just prior to pausing the system. In some embodiments, automatic control of the pressure drop feedback circuits (through controller 261) and of valves 251 and 253, will be provided in a coordinated manner.

Flow sensor 235 is positioned on sample line 220 to provide a direct measure of the sample fluid flow rate. Suitable high precision liquid flow sensors and liquid flow meters with measurement ranges down to nanoliters per minute are commercially available from, for example, Sensirion Inc. (Westlake Village, CA). Flow sensor 235 is optional, but facilitates setting up the flow system. During instrument setup (system calibration), the fluidic resistance of fluidic resistance unit 222 is adjusted to provide the desired ratio of sheath to sample fluid, and the flow sensor provides an independent measure of the resulting sample fluid flow rate. Alternatively, the flow rate of the sample fluid can be measured by other means, such as by analyzing a sample containing a known concentration of test particles. By measuring the rate of detection of the test particles, the flow rate in the sample line 220 can be inferred.

In some embodiments, the subject flow cytometers are operated in conjunction with programmable logic that may be implemented in hardware, software, firmware, or any combination thereof in order to change a resistance state of the fluidic resistance unit. For example, where programmable logic is implemented in software, resistance state adjustments may be realized at least in part by a computer-readable data storage medium comprising program code including instructions that, when executed, is configured to initiate the switching of a valve in the valve line from an open state to a closed state. The subject programmable logic may be implemented in any of a variety of devices such as specifically programmed event processing computers, wireless communication devices, integrated circuit devices, or the like. In some embodiments, the programable logic may be executed by a specifically programmed processor, which may include one or more processors, such as one or more digital signal processors (DSPs), configurable microprocessors, application specific integrated circuits (ASICs), field programmable gate arrays (FPGAs), or other equivalent integrated or discrete logic circuitry. A combination of computing devices, e.g., a combination of a DSP and a microprocessor, a plurality of microprocessors, one or more microprocessors in conjunction with a DSP core, or any other such configuration in at least partial data connectivity may implement one or more of the features described herein.

Embodiments of the subject flow cytometers include processors. Processors of interest are operably connected to each valve of the valve line are configured to change a resistance state of the fluidic resistance unit by initiating the switching of a valve in the valve line from an open state to a closed state, or vice versa. In some cases, the processors are configured to compare an actual flow rate to a target flow rate, and adjust a resistance state of the fluidic resistance unit according in order to achieve the target flow rate. In select versions, processors operate automatically, e.g., in an automated feedback control circuit. In some cases, the processor may receive input from a user. The processor may, in such cases, receive input regarding a target flow rate and the processor changes a resistance state of the fluidic resistance unit in order to achieve said target flow rate.

Figure 3:
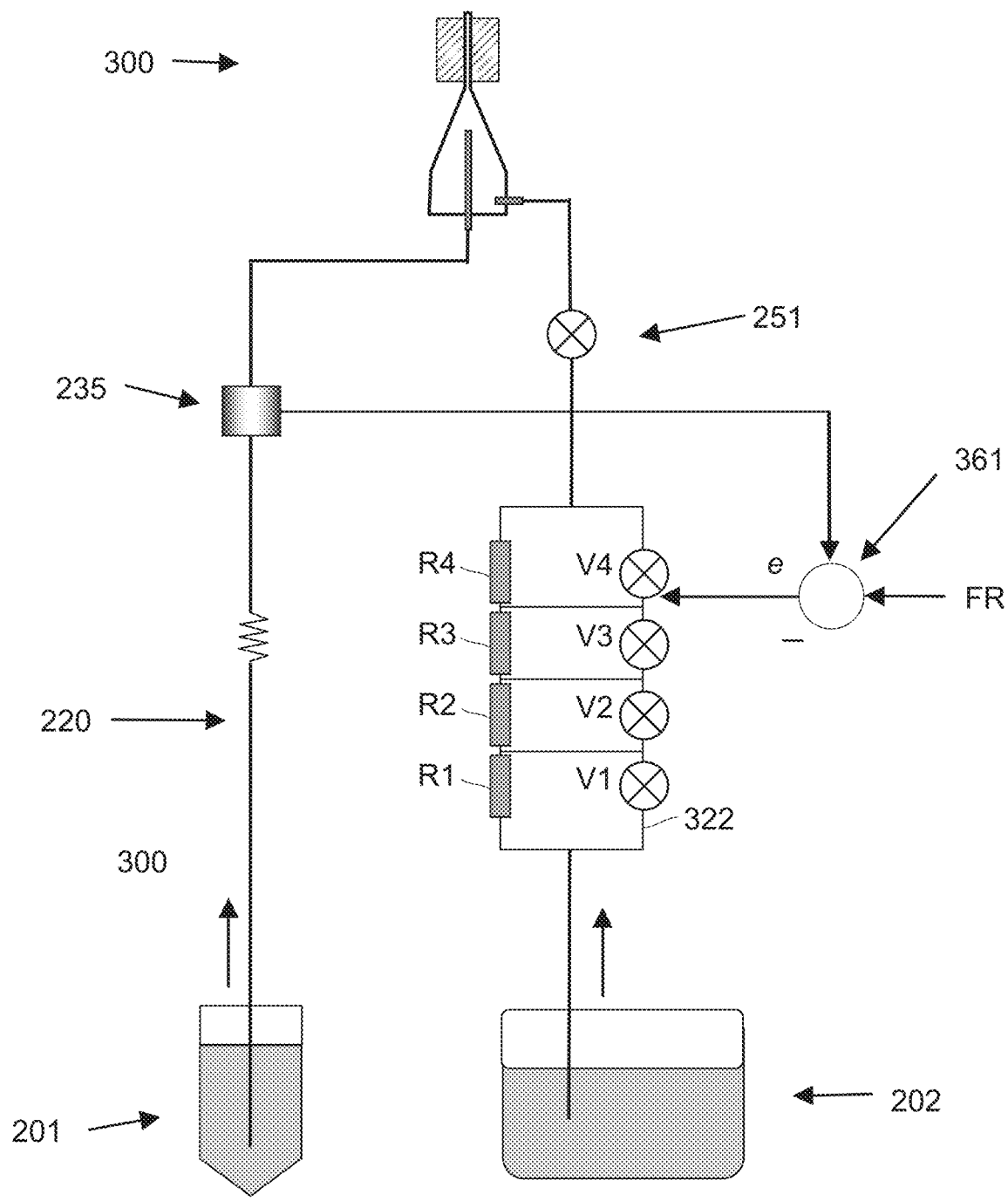
FIG. 3 depicts a fluidic system configured to change the resistance of the fluidic resistance unit.

FIG. 3 depicts an automated feedback control circuit for automatically modulating the sample fluid flow rate to obtain a preselected sample fluid flow rate during system calibration. Fluidic resistance unit 322 is configured to enable modulation of the fluidic resistance using a servomechanism. Processor 361 compares the flow rate measured by flow sensor 235 to a stored desired flow rate FR and modulates the fluidic resistance of variable resistance fluidic resistor 322 until the measured flow rate matches the desired flow rate FR. Processor 361 is configured to open or close any of the valves in fluidic resistance unit 322, e.g., via servomechanisms.

As mentioned previously, flow cytometers of the invention include a flow cell for transporting particles in a flow stream. The flow stream may be configured for irradiation with light from a light source at an interrogation point. The flow stream for which the flow channel is configured may include a liquid sample injected from a sample tube. In certain embodiments, the flow stream may include a narrow, rapidly flowing stream of liquid that is arranged such that linearly segregated particles transported therein are separated from each other in a single-file manner. The "interrogation point" discussed herein refers to a region within the flow cell in which the particle is irradiated by light from the light source, e.g., for analysis. The size of the interrogation point may vary as desired. For example, where 0 μm represents the axis of light emitted by the light source, the interrogation point may range from −100 μm to 100 μm, such as −50 μm to 50 μm, such as −25 μm to 40 μm, and including −15 μm to 30 μm.

After particles are irradiated in the flow cell, particle-modulated light may be observed. By "particle-modulated light" it is meant light that is received from the particles in the flow stream following the irradiation of the particles with light from the light source. In some cases, the particle-modulated light is side-scattered light. As discussed herein, side-scattered light refers to light refracted and reflected from the surfaces and internal structures of the particle. In additional embodiments, the particle-modulated light includes forward-scattered light (i.e., light that travels through or around the particle in mostly a forward direction). In still other cases, the particle-modulated light includes fluorescent light (i.e., light emitted from a fluorochrome following irradiation with excitation wavelength light).

Aspects of the invention also include a light source configured to irradiate particles passing through the flow cell at an interrogation point. Any convenient light source may be employed as the light source described herein. In some embodiments, the light source is a laser. In embodiments, the laser may be any convenient laser, such as a continuous wave laser. For example, the laser may be a diode laser, such as an ultraviolet diode laser, a visible diode laser and a near-infrared diode laser. In other embodiments, the laser may be a helium-neon (HeNe) laser. In some instances, the laser is a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the subject flow cytometers include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject flow cytometers include a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

Laser light sources according to certain embodiments may also include one or more optical adjustment components. In certain embodiments, the optical adjustment component is located between the light source and the flow cell, and may include any device that is capable of changing the spatial width of irradiation or some other characteristic of irradiation from the light source, such as for example, irradiation direction, wavelength, beam width, beam intensity and focal spot. Optical adjustment protocols may include any convenient device which adjusts one or more characteristics of the light source, including but not limited to lenses, mirrors, filters, fiber optics, wavelength separators, pinholes, slits, collimating protocols and combinations thereof. In certain embodiments, flow cytometers of interest include one or more focusing lenses. The focusing lens, in one example, may be a de-magnifying lens. In still other embodiments, flow cytometers of interest include fiber optics.

Where the optical adjustment component is configured to move, the optical adjustment component may be configured to be moved continuously or in discrete intervals, such as for example in 0.01 µm or greater increments, such as 0.05 µm or greater, such as 0.1 µm or greater, such as 0.5 µm or greater such as 1 µm or greater, such as 10 µm or greater, such as 100 µm or greater, such as 500 µm or greater, such as 1 mm or greater, such as 5 mm or greater, such as 10 mm or greater and including 25 mm or greater increments.

Any displacement protocol may be employed to move the optical adjustment component structures, such as coupled to a moveable support stage or directly with a motor actuated translation stage, leadscrew translation assembly, geared translation device, such as those employing a stepper motor, servo motor, brushless electric motor, brushed DC motor, micro-step drive motor, high resolution stepper motor, among other types of motors.

The light source may be positioned any suitable distance from the flow cell, such as where the light source and the flow cell are separated by 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, the light source may be positioned at any suitable angle relative to the flow cell, such as at an angle ranging from 10 degrees to 90 degrees, such as from 15 degrees to 85 degrees, such as from 20 degrees to 80 degrees, such as from 25 degrees to 75 degrees and including from 30 degrees to 60 degrees, for example at a 90 degree angle.

In some embodiments, light sources of interest include a plurality of lasers configured to provide laser light for discrete irradiation of the flow stream, such as 2 lasers or more, such as 3 lasers or more, such as 4 lasers or more, such as 5 lasers or more, such as 10 lasers or more, and including 15 lasers or more configured to provide laser light for discrete irradiation of the flow stream. Depending on the desired wavelengths of light for irradiating the flow stream, each laser may have a specific wavelength that varies from 200 nm to 1500 nm, such as from 250 nm to 1250 nm, such as from 300 nm to 1000 nm, such as from 350 nm to 900 nm and including from 400 nm to 800 nm. In certain embodiments, lasers of interest may include one or more of a 405 nm laser, a 488 nm laser, a 561 nm laser and a 635 nm laser.

Flow cytometers of interest may further include one or more particle-modulated light detectors for detecting particle-modulated light intensity data. In some embodiments, the particle-modulated light detector(s) include one or more forward-scattered light detectors configured to detect forward-scattered light. For example, the subject particle analyzers may include 1 forward-scattered light detector or multiple forward-scattered light detectors, such as 2 or more, such as 3 or more, such as 4 or more, and including 5 or more. In certain embodiments, particle analyzers include 1 forward-scattered light detector. In other embodiments, particle analyzers include 2 forward-scattered light detectors.

Any convenient detector for detecting collected light may be used in the forward-scattered light detector described herein. Detectors of interest may include, but are not limited to, optical sensors or detectors, such as active-pixel sensors (APSs), avalanche photodiodes, image sensors, charge-coupled devices (CODs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from cm$^2$ to 10 cm$^2$, such as from 0.05 cm$^2$ to 9 cm$^2$, such as from 0.1 cm$^2$ to 8 cm$^2$, such as from 0.5 cm$^2$ to 7 cm$^2$ and including from 1 cm$^2$ to 5 cm$^2$.

In embodiments, the forward-scattered light detector is configured to measure light continuously or in discrete intervals. In some instances, detectors of interest are configured to take measurements of the collected light continuously. In other instances, detectors of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

In additional embodiments, the one or more particle-modulated light detector(s) may include one or more side-scattered light detectors for detecting side-scatter wavelengths of light (i.e., light refracted and reflected from the surfaces and internal structures of the particle). In some embodiments, particle analyzers include a single side-scattered light detector. In other embodiments, particle analyzers include multiple side-scattered light detectors, such as 2 or more, such as 3 or more, such as 4 or more, and including 5 or more.

Any convenient detector for detecting collected light may be used in the side-scattered light detector described herein. Detectors of interest may include, but are not limited to, optical sensors or detectors, such as active-pixel sensors (APSs), avalanche photodiodes, image sensors, charge-coupled devices (CODs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from cm$^2$ to 10 cm$^2$, such as from 0.05 cm$^2$ to 9 cm$^2$, such as from 0.1 cm$^2$ to 8 cm$^2$, such as from 0.5 cm$^2$ to 7 cm$^2$ and including from 1 cm$^2$ to 5 cm$^2$.

In embodiments, the subject particle analyzers also include a fluorescent light detector configured to detect one or more fluorescent wavelengths of light. In other embodiments, particle analyzers include multiple fluorescent light detectors such as 2 or more, such as 3 or more, such as 4 or more, 5 or more, 10 or more, 15 or more, and including 20 or more.

Any convenient detector for detecting collected light may be used in the fluorescent light detector described herein. Detectors of interest may include, but are not limited to, optical sensors or detectors, such as active-pixel sensors (APSs), avalanche photodiodes, image sensors, charge-coupled devices (CODs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from cm$^2$ to 10 cm$^2$, such as from 0.05 cm$^2$ to 9 cm$^2$, such as from, such as from 0.1 cm$^2$ to 8 cm$^2$, such as from 0.5 cm$^2$ to 7 cm$^2$ and including from 1 cm$^2$ to 5 cm$^2$.

Where the subject particle analyzers include multiple fluorescent light detectors, each fluorescent light detector may be the same, or the collection of fluorescent light detectors may be a combination of different types of detectors. For example, where the subject particle analyzers include two fluorescent light detectors, in some embodiments the first fluorescent light detector is a CCD-type device and the second fluorescent light detector (or imaging sensor) is a CMOS-type device. In other embodiments, both the first and second fluorescent light detectors are CCD-type devices. In yet other embodiments, both the first and second fluorescent light detectors are CMOS-type devices. In still other embodiments, the first fluorescent light detector is a CCD-type device and the second fluorescent light detector is a photomultiplier tube (PMT). In still other embodiments, the first fluorescent light detector is a CMOS-type device and the second fluorescent light detector is a photomultiplier tube. In yet other embodiments, both the first and second fluorescent light detectors are photomultiplier tubes.

In embodiments of the present disclosure, fluorescent light detectors of interest are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths. In some embodiments, 2 or more detectors in the particle analyzers as described herein are configured to measure the same or overlapping wavelengths of collected light.

In some embodiments, fluorescent light detectors of interest are configured to measure collected light over a range of wavelengths (e.g., 200 nm-1000 nm). In certain embodiments, detectors of interest are configured to collect spectra of light over a range of wavelengths. For example, particle analyzers may include one or more detectors configured to collect spectra of light over one or more of the wavelength ranges of 200 nm-1000 nm. In yet other embodiments, detectors of interest are configured to measure light emitted by a sample in the flow stream at one or more specific wavelengths. For example, particle analyzers may include one or more detectors configured to measure light at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof. In certain embodiments, one or more detectors may be configured to be paired with specific fluorophores, such as those used with the sample in a fluorescence assay.

In some embodiments, particle analyzers include one or more wavelength separators positioned between the flow cell and the particle-modulated light detector(s). The term "wavelength separator" is used herein in its conventional sense to refer to an optical component that is configured to separate light collected from the sample into predetermined spectral ranges. In some embodiments, particle analyzers include a single wavelength separator. In other embodiments, particle analyzers include a plurality of wavelength separators, such as 2 or more wavelength separators, such as 3 or more, such as 4 or more, such as 5 or more, such as 6 or more, such as 7 or more, such as 8 or more, such as 9 or more, such as 10 or more, such as 15 or more, such as 25 or more, such as 50 or more, such as 75 or more and including 100 or more wavelength separators. In some embodiments, the wavelength separator is configured to separate light collected from the sample into predetermined spectral ranges by passing light having a predetermined spectral range and reflecting one or more remaining spectral ranges of light. In other embodiments, the wavelength separator is configured to separate light collected from the sample into predetermined spectral ranges by passing light having a predetermined spectral range and absorbing one or more remaining spectral ranges of light. In yet other embodiments, the wavelength separator is configured to spatially diffract light collected from the sample into predetermined spectral ranges. Each wavelength separator may be any convenient light separation protocol, such as one or more dichroic mirrors, bandpass filters, diffraction gratings, beam splitters or prisms. In some embodiments, the wavelength separator is a prism. In other embodiments, the wavelength separator is a diffraction grating. In certain embodiments, wavelength separators in the subject light detection systems are dichroic mirrors.

Suitable flow cytometry systems may include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Prac-* tical Flow Cytometry, 3rd ed., Wiley-Liss (1995); Virgo, et al. (2012) Ann Clin Biochem. January; 49(pt 1):17-28; Linden, et. al., Semin Throm Hemost. 2004 October; 30(5): 502-11; Alison, et al. J Pathol, 2010 December; 222(4):335-344; and Herbig, et al. (2007) Crit Rev Ther Drug Carrier Syst. 24(3):203-255; the disclosures of which are incorporated herein by reference. In certain instances, flow cytometry systems of interest include BD Biosciences FACSCanto™ flow cytometer, BD Biosciences FACSCanto™ II flow cytometer, BD Accuri™ flow cytometer, BD Accuri™ C6 Plus flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer, BD Biosciences LSRFortessa™ flow cytometer, BD Biosciences LSRFortessa™ X-20 flow cytometer, BD Biosciences FACSPresto™ flow cytometer, BD Biosciences FACSVia™ flow cytometer and BD Biosciences FACSCalibur™ cell sorter, a BD Biosciences FACSCount™ cell sorter, BD Biosciences FACSLyric™ cell sorter, BD Biosciences Via™ cell sorter, BD Biosciences Influx™ cell sorter, BD Biosciences Jazz™ cell sorter, BD Biosciences Aria™ cell sorter, BD Biosciences FACSAria™ II cell sorter, BD Biosciences FACSAria™ III cell sorter, BD Biosciences FACSAria™ Fusion cell sorter and BD Biosciences FACSMelody™ cell sorter, BD Biosciences FACSymphony™ S6 cell sorter or the like.

In some embodiments, the subject systems are flow cytometric systems, such those described in U.S. Pat. Nos. 10,663,476; 10,620,111; 10,613,017; 10,605,713; 10,585,031; 10,578,469; 10,481,074; 10,302,545; 10,145,793; 10,113,967; 10,006,852; 9,952,076; 9,933,341; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; 4,987,086; 4,498,766; the disclosures of which are herein incorporated by reference in their entirety.

Figure 4:
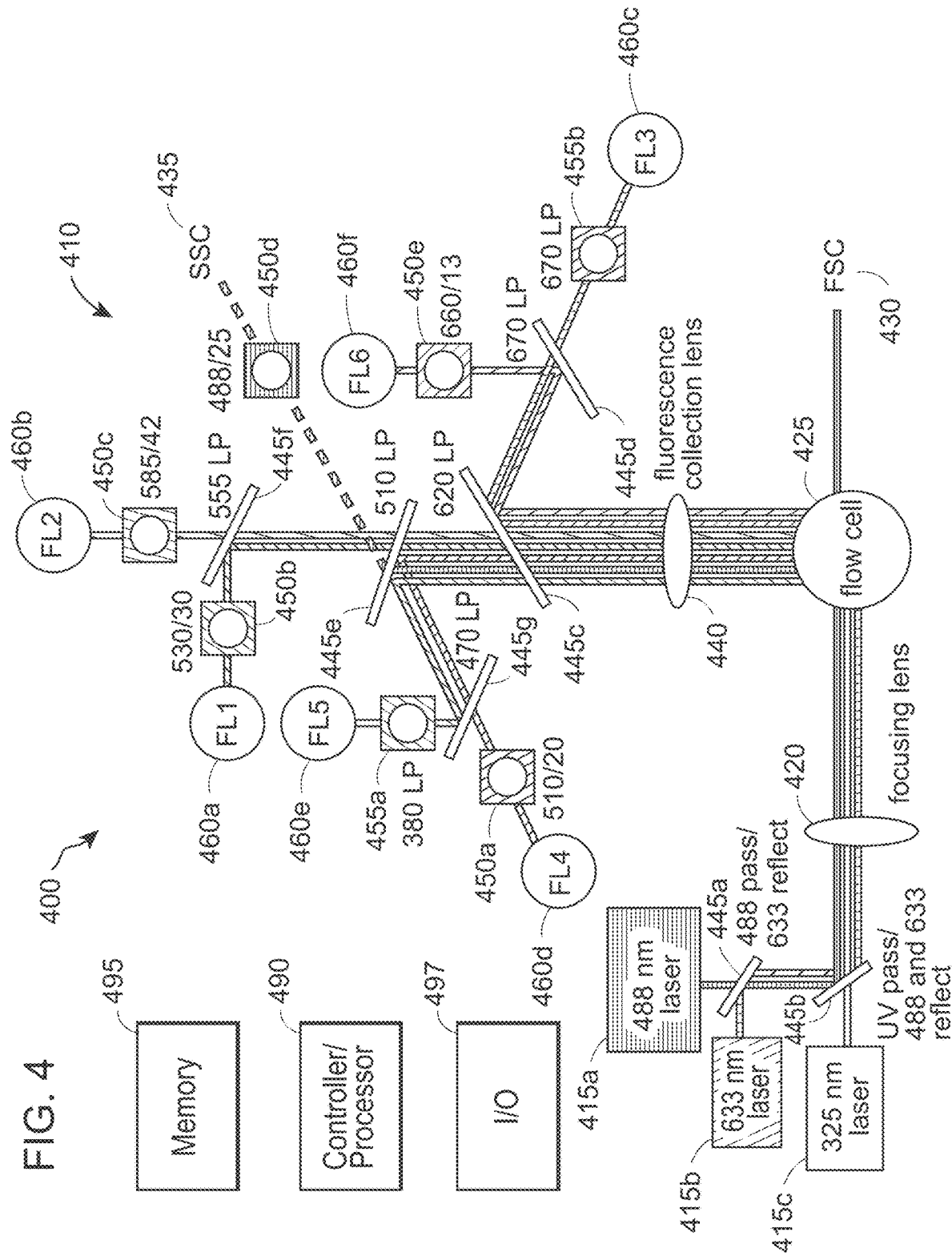
FIG. 4 depicts a functional block diagram of a flow cytometric system according to certain embodiments.

FIG. 4 shows a system 400 for flow cytometry in accordance with an illustrative embodiment of the present invention. The system 400 includes a flow cytometer 410, a controller/processor 490 and a memory 495. The flow cytometer 410 includes one or more excitation lasers 415a-415c, a focusing lens 420, a flow chamber 425, a forward-scatter detector 430, a side-scatter detector 435, a fluorescence collection lens 440, one or more beam splitters 445a-445g, one or more bandpass filters 450a-450e, one or more longpass ("LP") filters 455a-455b, and one or more fluorescent detectors 460a-460f.

The excitation lasers 415a-c emit light in the form of a laser beam. The wavelengths of the laser beams emitted from excitation lasers 415a-415c are 488 nm, 633 nm, and 325 nm, respectively, in the example system of FIG. 4. The laser beams are first directed through one or more of beam splitters 445a and 445b. Beam splitter 445a transmits light at 488 nm and reflects light at 633 nm. Beam splitter 445b transmits UV light (light with a wavelength in the range of 10 to 400 nm) and reflects light at 488 nm and 633 nm.

The laser beams are then directed to a focusing lens 420, which focuses the beams onto the portion of a fluid stream where particles of a sample are located, within the flow chamber 425. The flow chamber is part of a fluidics system which directs particles, typically one at a time, in a stream to the focused laser beam for interrogation. The flow chamber can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. The fluorescence emissions as well as the diffracted light, refracted light, reflected light, and scattered light may be routed to one or more of the forward-scatter detector 430, the side-scatter detector 435, and the one or more fluorescent detectors 460a-460f through one or more of the beam splitters 445c-445g, the bandpass filters 450a-450e, the longpass filters 455a-455b, and the fluorescence collection lens 440.

The fluorescence collection lens 440 collects light emitted from the particle-laser beam interaction and routes that light towards one or more beam splitters and filters. Bandpass filters, such as bandpass filters 450a-450e, allow a narrow range of wavelengths to pass through the filter. For example, bandpass filter 450a is a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters, such as longpass filters 455a-455b, transmit wavelengths of light equal to or longer than a specified wavelength of light. For example, longpass filter 455b, which is a 670 nm longpass filter, transmits light equal to or longer than 670 nm. Filters are often selected to optimize the specificity of a detector for a particular fluorescent dye. The filters can be configured so that the spectral band of light transmitted to the detector is close to the emission peak of a fluorescent dye.

The forward-scatter detector 430 is positioned slightly off axis from the direct beam through the flow cell and is configured to detect diffracted light, the excitation light that travels through or around the particle in mostly a forward direction. The intensity of the light detected by the forward-scatter detector is dependent on the overall size of the particle. The forward-scatter detector can include a photodiode. The side-scatter detector 435 is configured to detect refracted and reflected light from the surfaces and internal structures of the particle that tends to increase with increasing particle complexity of structure. The fluorescence emissions from fluorescent molecules associated with the particle can be detected by the one or more fluorescent detectors 460a-460f. The side-scatter detector 435 and fluorescent detectors can include photomultiplier tubes. The signals detected at the forward-scatter detector 430, the side-scatter detector 435 and the fluorescent detectors can be converted to electronic signals (voltages) by the detectors. This data can provide information about the sample.

One of skill in the art will recognize that a flow cytometer in accordance with an embodiment of the present invention is not limited to the flow cytometer depicted in FIG. 4, but can include any flow cytometer known in the art. For example, a flow cytometer may have any number of lasers, beam splitters, filters, and detectors at various wavelengths and in various different configurations.

In operation, cytometer operation is controlled by a controller/processor 490, and the measurement data from the detectors can be stored in the memory 495 and processed by the controller/processor 490. Although not shown explicitly, the controller/processor 490 is coupled to the detectors to receive the output signals therefrom, and may also be coupled to electrical and electromechanical components of the flow cytometer 410 to control the lasers, fluid flow parameters, and the like. Input/output (I/O) capabilities 497 may be provided also in the system. The memory 495, controller/processor 490, and I/O 497 may be entirely provided as an integral part of the flow cytometer 410. In such an embodiment, a display may also form part of the I/O capabilities 497 for presenting experimental data to users of the cytometer 410. Alternatively, some or all of the memory 495 and controller/processor 490 and I/O capabilities may be part of one or more external devices such as a general purpose computer. In some embodiments, some or all of the memory 495 and controller/processor 490 can be in wireless or wired communication with the cytometer 410. The controller/processor 490 in conjunction with the memory 495 and the I/O 497 can be configured to perform various functions related to the preparation and analysis of a flow cytometer experiment.

The system illustrated in FIG. 4 includes six different detectors that detect fluorescent light in six different wavelength bands (which may be referred to herein as a "filter window" for a given detector) as defined by the configuration of filters and/or splitters in the beam path from the flow cell 425 to each detector. Different fluorescent molecules in a fluorochrome panel used for a flow cytometer experiment will emit light in their own characteristic wavelength bands. The particular fluorescent labels used for an experiment and their associated fluorescent emission bands may be selected to generally coincide with the filter windows of the detectors. The I/O 497 can be configured to receive data regarding a flow cytometer experiment having a panel of fluorescent labels and a plurality of cell populations having a plurality of markers, each cell population having a subset of the plurality of markers. The I/O 497 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 495. The controller/processor 490 can be configured to evaluate one or more assignments of labels to markers.

Figure 5:
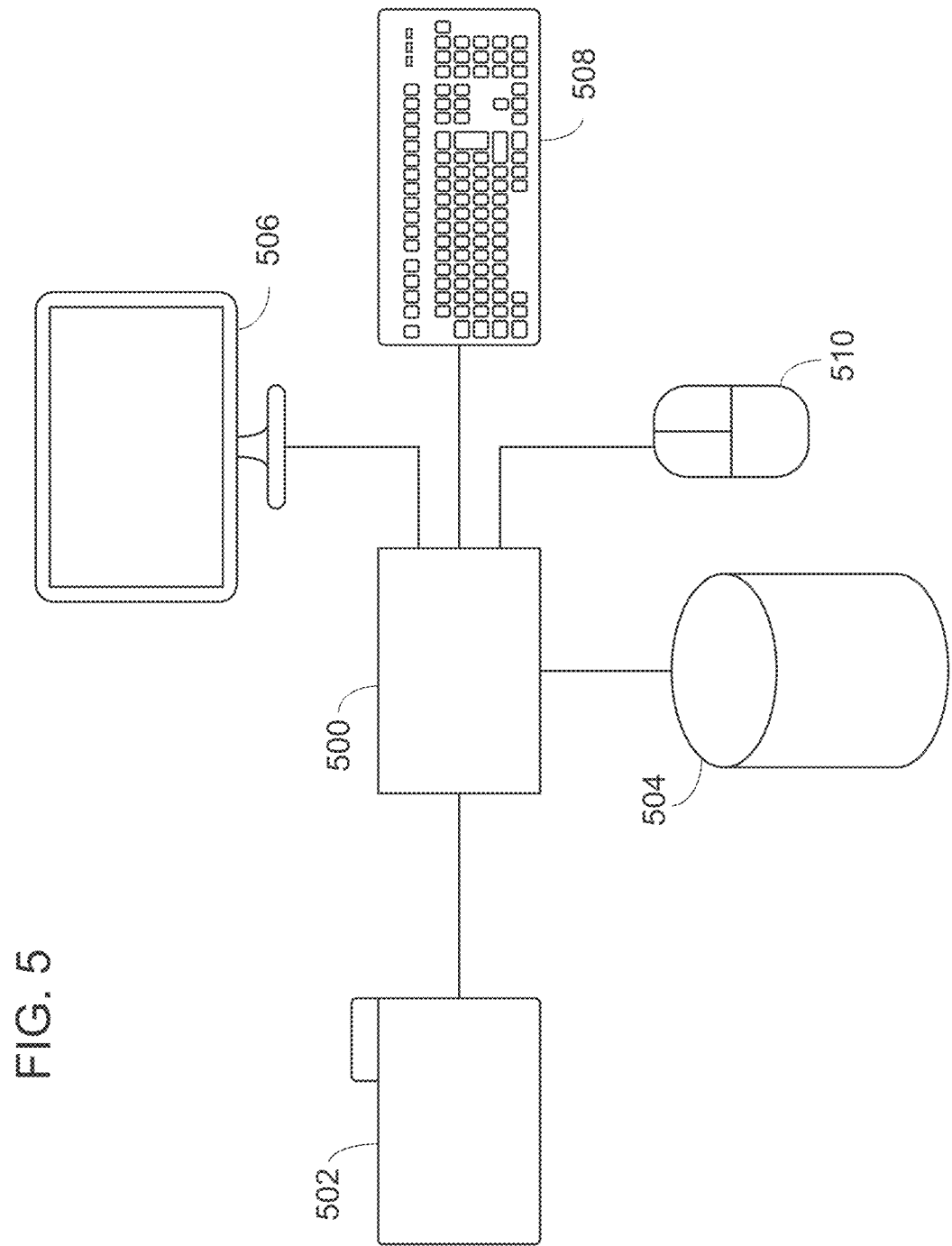
FIG. 5 depicts a system for analyzing and displaying biological events according to certain embodiments of the invention.

FIG. 5 shows a functional block diagram for one example of a processing system for analyzing and displaying biological events. A processor 500 can be configured to implement a variety of processes for controlling graphic display of biological events.

A flow cytometer 502 can be configured to acquire biological event data. For example, a flow cytometer can generate flow cytometric event data (e.g., particle-modulated light data). The flow cytometer 502 can be configured to provide biological event data to the processor 500. A data communication channel can be included between the flow cytometer 502 and the processor 500. The biological event data can be provided to the processor 500 via the data communication channel.

The processor 500 can be configured to receive biological event data from the flow cytometer 502. The biological event data received from the flow cytometer 502 can include flow cytometric event data. The processor 500 can be configured to provide a graphical display of biological event data to a display device 506. The processor 500 can be further configured to render a region of interest as a gate around a population of biological event data shown by the display device 506. In some embodiments, the gate can be a logical combination of one or more graphical regions of interest drawn upon a single parameter histogram or bivariate plot. In some embodiments, the display can be used to display particle parameters or saturated detector data.

The processor 500 can be further configured to display the biological event data on the display device 506 within the gate differently from other events in the biological event data outside of the gate. For example, the processor 500 can be configured to render the color of biological event data contained within the gate to be distinct from the color of biological event data outside of the gate. The display device 506 can be implemented as a monitor, a tablet computer, a smartphone, or other electronic device configured to present graphical interfaces.

The processor 500 can be configured to receive a gate selection signal identifying the gate from a first input device. For example, the first input device can be implemented as a mouse 510. The mouse 510 can initiate a gate selection signal to the processor 500 identifying the gate to be displayed on or manipulated via the display device 506 (e.g., by clicking on or in the desired gate when the cursor is positioned there). In some implementations, the first device can be implemented as the keyboard 508 or other means for providing an input signal to the processor 500 such as a touchscreen, a stylus, an optical detector, or a voice recognition system. Some input devices can include multiple inputting functions. In such implementations, the inputting functions can each be considered an input device. For example, as shown in FIG. the mouse 510 can include a right mouse button and a left mouse button, each of which can generate a triggering event.

The triggering event can cause the processor 500 to alter the manner in which the data is displayed, which portions of the data is actually displayed on the display device 506, and/or provide input to further processing such as selection of a population of interest for particle sorting.

In some embodiments, the processor 500 can be configured to detect when gate selection is initiated by the mouse 510. The processor 500 can be further configured to automatically modify plot visualization to facilitate the gating process. The modification can be based on the specific distribution of biological event data received by the processor 500. In some embodiments, the processor 500 expands the first gate such that a second gate is generated (e.g., as discussed above).

The processor 500 can be connected to a storage device 504. The storage device 504 can be configured to receive and store biological event data from the processor 500. The storage device 504 can also be configured to receive and store flow cytometric event data from the processor 500. The storage device 504 can be further configured to allow retrieval of biological event data, such as flow cytometric event data, by the processor 500.

The display device 506 can be configured to receive display data from the processor 500. The display data can comprise plots of biological event data and gates outlining sections of the plots. The display device 506 can be further configured to alter the information presented according to input received from the processor 500 in conjunction with input from the flow cytometer 502, the storage device 504, the keyboard 508, and/or the mouse 510.

Methods of Analyzing a Sample

Aspects of the invention also include methods of analyzing a sample. Methods of interest include (a) introducing a particulate sample into a flow cytometer having a flow cell for transporting particles in a flow stream, a sheath fluid line for fluidically coupling to a sheath fluid reservoir, and a fluidic resistance unit positioned between the sheath fluid line and the flow cell, and (b) flow cytometrically analyzing the sample. Fluidic resistance units for use in the subject methods are described above and include an inlet fluidically coupled to the sheath fluid line, a valve line fluidically coupled to the inlet, a resistor line fluidically coupled to the inlet, a plurality of connectors fluidically coupling the valve line to the resistor line, and an outlet fluidically coupling the fluidic resistance unit to the flow cell.

In some embodiments, methods also include changing a resistance state of the fluidic resistance unit by switching a valve of the valve line from an open state to a closed state, or vice versa. In such embodiments, a practitioner of the method may initiate the switching of one or more valves, for example, by inputting a desired flow rate into a processor of the flow cytometer.

In some instances, the sample analyzed in the instant methods is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class Mammalia, including the orders carnivore (e.g., dogs and cats), Rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses.

Cells of interest may be targeted for characterized according to a variety of parameters, such as a phenotypic characteristic identified via the attachment of a particular fluorescent label to cells of interest. In some embodiments, the system is configured to deflect analyzed droplets that are determined to include a target cell. A variety of cells may be characterized using the subject methods. Target cells of interest include, but are not limited to, stem cells, T cells, dendritic cells, B Cells, granulocytes, leukemia cells, lymphoma cells, virus cells (e.g., HIV cells), NK cells, macrophages, monocytes, fibroblasts, epithelial cells, endothelial cells, and erythroid cells. Target cells of interest include cells that have a convenient cell surface marker or antigen that may be captured or labelled by a convenient affinity agent or conjugate thereof. For example, the target cell may include a cell surface antigen such as CD11b, CD123, CD14, CD15, CD16, CD19, CD193, CD2, CD25, CD27, CD3, CD335, CD36, CD4, CD43, CD45RO, CD56, CD61, CD7, CD8, CD34, CD1c, CD23, CD304, CD235a, T cell receptor alpha/beta, T cell receptor gamma/delta, CD253, CD95, CD20, CD105, CD117, CD120b, Notch4, Lgr5 (N-Terminal), SSEA-3, TRA-1-60 Antigen, Disialoganglioside GD2 and CD71. In some embodiments, the target cell is selected from HIV containing cell, a Treg cell, an antigen-specific T-cell populations, tumor cells or hematopoietic progenitor cells (CD34+) from whole blood, bone marrow or cord blood.

In practicing the subject methods, an amount of an initial fluidic sample is injected into the flow cytometer. The amount of sample injected into the particle sorting module may vary, for example, ranging from 0.001 mL to 1000 mL, such as from 0.005 mL to 900 mL, such as from mL to 800 mL, such as from 0.05 mL to 700 mL, such as from 0.1 mL to 600 mL, such as from 0.5 mL to 500 mL, such as from 1 mL to 400 mL, such as from 2 mL to 300 mL and including from 5 mL to 100 mL of sample.

Methods according to embodiments of the present disclosure include counting and optionally sorting labeled particles (e.g., target cells) in a sample. In practicing the subject methods, the fluidic sample including the particles is first introduced into a flow nozzle of the system. Upon exit from the flow nozzle, the particles are passed substantially one at a time through the sample interrogation region where each of the particles is irradiated to a source of light and measurements of light scatter parameters and, in some instances, fluorescent emissions as desired (e.g., two or more light scatter parameters and measurements of one or more fluorescent emissions) are separately recorded for each particle. Depending on the properties of the flow stream being interrogated, 0.001 mm or more of the flow stream may be irradiated with light, such as 0.005 mm or more, such as 0.01 mm or more, such as 0.05 mm or more, such as 0.1 mm or more, such as 0.5 mm or more and including 1 mm or more of the flow stream may be irradiated with light. In certain embodiments, methods include irradiating a planar cross-section of the flow stream in the sample interrogation region, such as with a laser (as described above). In other embodiments, methods include irradiating a predetermined length of the flow stream in the sample interrogation region, such as corresponding to the irradiation profile of a diffuse laser beam or lamp.

In certain embodiments, methods including irradiating the flow stream at or near the flow cell nozzle orifice. For example, methods may include irradiating the flow stream at a position about 0.001 mm or more from the nozzle orifice, such as 0.005 mm or more, such as 0.01 mm or more, such as 0.05 mm or more, such as 0.1 mm or more, such as 0.5 mm or more and including 1 mm or more from the nozzle orifice. In certain embodiments, methods include irradiating the flow stream immediately adjacent to the flow cell nozzle orifice.

In embodiments of the method, detectors, such as photomultiplier tubes (PMT), are used to record light that passes through each particle (in certain cases referred to as forward light scatter), light that is reflected orthogonal to the direction of the flow of the particles through the sensing region (in some cases referred to as orthogonal or side light scatter) and fluorescent light emitted from the particles, if it is labeled with fluorescent marker(s), as the particle passes through the sensing region and is illuminated by the energy source. Each of forward light scatter (FSC), side-scatter (SSC), and fluorescence emissions include a separate parameter for each particle (or each "event"). Thus, for example, two, three or four parameters can be collected (and recorded) from a particle labeled with two different fluorescence markers.

The data recorded for each particle is analyzed in real time or stored in a data storage and analysis means, such as a computer, as desired. U.S. Pat. No. 4,284,412 describes the configuration and use of a flow cytometer of interest equipped with a single light source while U.S. Pat. No. 4,727,020 describes the configuration and use of a flow cytometer equipped with two light sources.

In certain embodiments, the particles are detected and uniquely identified by exposing the particles to excitation light and measuring the fluorescence of each particle in one or more detection channels, as desired. Fluorescence emitted in detection channels used to identify the particles and binding complexes associated therewith may be measured following excitation with a single light source, or may be measured separately following excitation with distinct light sources. If separate excitation light sources are used to excite the particle labels, the labels may be selected such that all the labels are excitable by each of the excitation light sources used.

Methods in certain embodiments also include data acquisition, analysis and recording, such as with a computer, wherein multiple data channels record data from each detector for the light scatter and fluorescence emitted by each particle as it passes through the sample interrogation region of the particle sorting module. In these embodiments, analysis includes classifying and counting particles such that each particle is present as a set of digitized parameter values. The subject systems may be set to trigger on a selected parameter in order to distinguish the particles of interest from background and noise. "Trigger" refers to a preset threshold for detection of a parameter and may be used as a means for detecting passage of a particle through the light source. Detection of an event that exceeds the threshold for the selected parameter triggers acquisition of light scatter and fluorescence data for the particle. Data is not acquired for particles or other components in the medium being assayed which cause a response below the threshold. The trigger parameter may be the detection of forward-scattered light caused by passage of a particle through the light beam. The flow cytometer then detects and collects the light scatter and fluorescence data for the particle.

A particular subpopulation of interest is then further analyzed by "gating" based on the data collected for the entire population. To select an appropriate gate, the data is plotted so as to obtain the best separation of subpopulations possible. This procedure may be performed by plotting forward light scatter (FSC) vs. side (i.e., orthogonal) light scatter (SSC) on a two dimensional dot plot. A subpopulation of particles is then selected (i.e., those cells within the gate) and particles that are not within the gate are excluded. Where desired, the gate may be selected by drawing a line around the desired subpopulation using a cursor on a computer screen. Only those particles within the gate are then further analyzed by plotting the other parameters for these particles, such as fluorescence. Where desired, the above analysis may be configured to yield counts of the particles of interest in the sample.

Methods of interest may further include employing particles in research, laboratory testing, or therapy. In some embodiments, the subject methods include obtaining individual cells prepared from a target fluidic or tissue biological sample. For example, the subject methods include obtaining cells from fluidic or tissue samples to be used as a research or diagnostic specimen for diseases such as cancer. Likewise, the subject methods include obtaining cells from fluidic or tissue samples to be used in therapy. A cell therapy protocol is a protocol in which viable cellular material including, e.g., cells and tissues, may be prepared and introduced into a subject as a therapeutic treatment. Conditions that may be treated by the administration of the flow cytometrically sorted sample include, but are not limited to, blood disorders, immune system disorders, organ damage, etc.

A typical cell therapy protocol may include the following steps: sample collection, cell isolation, genetic modification, culture, and expansion in vitro, cell harvesting, sample volume reduction and washing, bio-preservation, storage, and introduction of cells into a subject. The protocol may begin with the collection of viable cells and tissues from source tissues of a subject to produce a sample of cells and/or tissues. The sample may be collected via any suitable procedure that includes, e.g., administering a cell mobilizing agent to a subject, drawing blood from a subject, removing bone marrow from a subject, etc. After collecting the sample, cell enrichment may occur via several methods including, e.g., centrifugation based methods, filter based methods, elutriation, magnetic separation methods, fluorescence-activated cell sorting (FACS), and the like. In some cases, the enriched cells may be genetically modified by any convenient method, e.g., nuclease mediated gene editing. The genetically modified cells can be cultured, activated, and expanded in vitro. In some cases, the cells are preserved, e.g., cryopreserved, and stored for future use where the cells are thawed and then administered to a patient, e.g., the cells may be infused in the patient.

Methods of Assembling a Flow Cytometer

As discussed above, aspects of the invention also include methods of assembling a flow cytometer. Methods of interest include fluidically coupling a fluidic resistance unit to a flow cell for transporting particles in a flow stream, and a sheath fluid line for fluidically coupling to a sheath fluid reservoir. Fluidic resistance units for use in the subject methods include an inlet fluidically coupled to the sheath fluid line, a valve line fluidically coupled to the inlet, a resistor line fluidically coupled to the inlet, a plurality of connectors fluidically coupling the valve line to the resistor line, and an outlet fluidically coupling the fluidic resistance unit to the flow cell. As discussed above, valve lines of interest include a series of fluidically coupled valves, and resistor lines of interest include a series of fluidically coupled resistors.

Embodiments of the subject methods include operably connecting a processor to each valve of the valve line. As discussed above, processors of interest are configured to change a resistance state of the fluidic resistance unit by initiating the switching of a valve in the valve line from an open state to a closed state, or vice versa. Processors may be operably connected to, e.g., servomechanisms configured to initiate the switching from an open state to a closed state, or vice versa. Methods of the invention may also involve connecting a sheath fluid reservoir to the sheath fluid line. As discussed above, a sheath fluid reservoir many be any suitable reservoir or container (e.g., having rigid or flexible walls) for holding sheath fluid. In certain embodiments, methods include fluidically coupling the sheath fluid reservoir to the input of the flow cell.

Computer-Controlled Systems

Aspects of the invention additionally include computer-controlled systems, where the systems include one or more computers for complete automation or partial automation. In some embodiments, systems include a computer having a non-transitory computer readable storage medium with a computer program stored thereon, where the computer program when loaded on the computer includes instructions for receiving a target or desired flow rate, and initiating a resistance state change in a fluidic resistance unit to achieve the target or desired flow rate. Systems may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor, or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, Python, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. In some embodiments, the processor includes analog electronics which provide feedback control, such as for example negative feedback control.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, or a diskette drive. Such types of memory storage devices typically read from, and/or write to, a program storage medium (not shown) such as a compact disk. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, Wi-Fi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, a USB-C port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or Wi-Fi connection to the internet at a Wi-Fi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a workstation, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows® NT®, Windows® XP, Windows® 7, Windows® 8, Windows® 10, iOS®, macOS®, Linux®, Ubuntu®, Fedora®, OS/400 ®, i5/OS®, IBM i®, Android™, SGI IRIX®, Oracle Solaris® and others.

Figure 6:
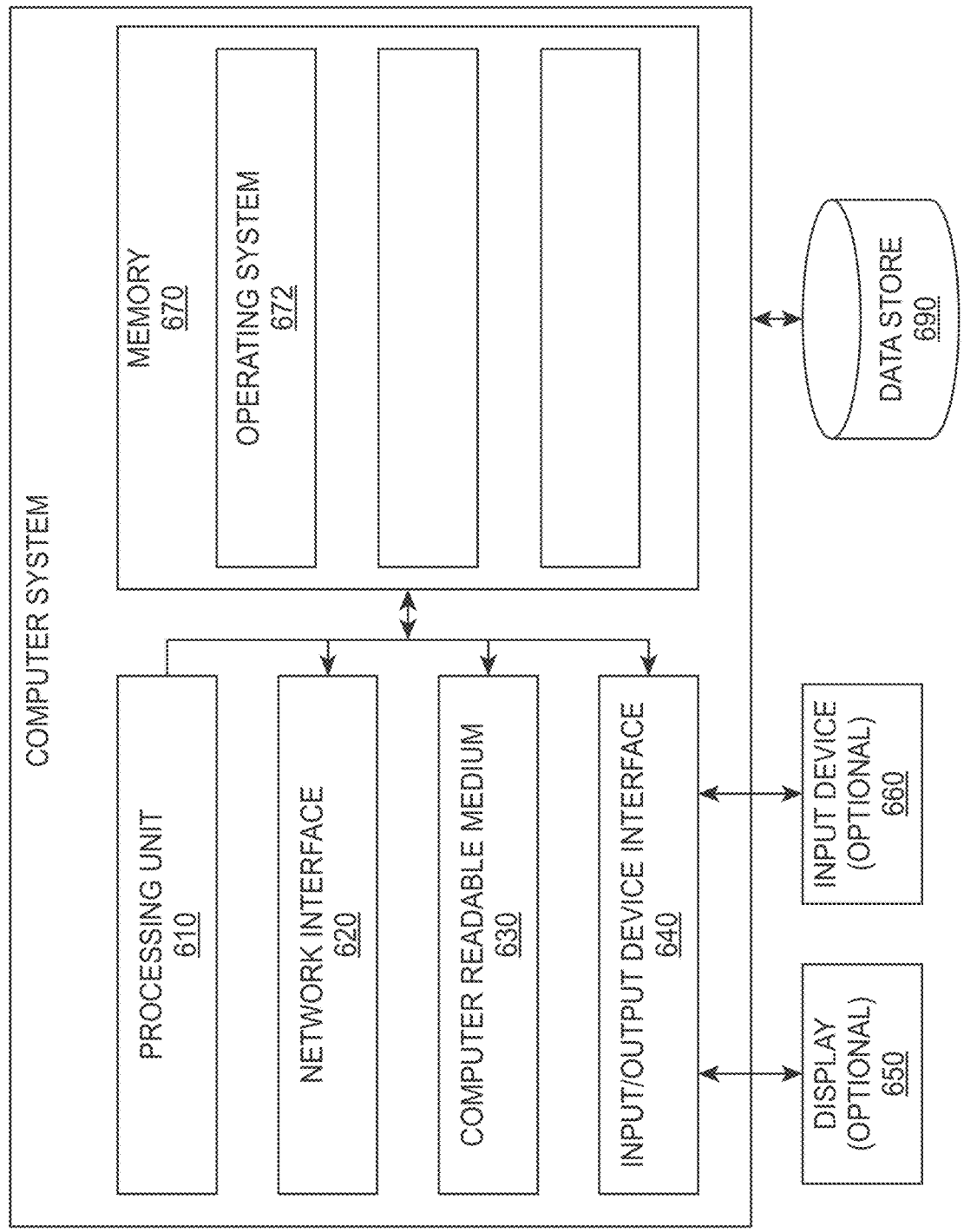
FIG. 6 depicts a block diagram of a computing system according to certain embodiments.

FIG. 6 depicts a general architecture of an example computing device 600 according to certain embodiments. The general architecture of the computing device 600 depicted in FIG. 6 includes an arrangement of computer hardware and software components. It is not necessary, however, that all of these generally conventional elements be shown in order to provide an enabling disclosure. As illustrated, the computing device 600 includes a processing unit 610, a network interface 620, a computer readable medium drive 630, an input/output device interface 640, a display 650, and an input device 660, all of which may communicate with one another by way of a communication bus. The network interface 620 may provide connectivity to one or more networks or computing systems. The processing unit 610 may thus receive information and instructions from other computing systems or services via a network. The processing unit 610 may also communicate to and from memory 670 and further provide output information for an optional display 650 via the input/output device interface 640. For example, an analysis software (e.g., data analysis software or program such as FlowJo®) stored as executable instructions in the non-transitory memory of the analysis system can display the flow cytometry event data to a user. The input/output device interface 640 may also accept input from the optional input device 660, such as a keyboard, mouse, digital pen, microphone, touch screen, gesture recognition system, voice recognition system, gamepad, accelerometer, gyroscope, or other input device.

The memory 670 may contain computer program instructions (grouped as modules or components in some embodiments) that the processing unit 610 executes in order to implement one or more embodiments. The memory 670 generally includes RAM, ROM and/or other persistent, auxiliary or non-transitory computer-readable media. The memory 670 may store an operating system 672 that provides computer program instructions for use by the processing unit 610 in the general administration and operation of the computing device 600. Data may be stored in data storage device 690. The memory 670 may further include computer program instructions and other information for implementing aspects of the present disclosure.

Utility

The subject fluidic resistance units, flow cytometers, and methods find use in a variety of applications where it is desirable to analyze components in a sample in a fluid medium. The present invention particularly finds use where it is desirable to improve sample flow rate control in vacuum-driven fluidics systems. For example, the present fluidic resistance units, flow cytometers, and methods may be employed to increase the number of resistance states relative to previously employed mechanisms for creating resistance in vacuum-driven fluidics.

Embodiments of the invention find use in applications where cells prepared from a biological sample may be desired for research, laboratory testing or for use in therapy. In some embodiments, the subject methods and devices may facilitate obtaining individual cells prepared from a target fluidic or tissue biological sample. For example, the subject methods and systems facilitate obtaining cells from fluidic or tissue samples to be used as a research or diagnostic specimen for diseases such as cancer. Likewise, the subject methods and systems may facilitate obtaining cells from fluidic or tissue samples to be used in therapy.

Kits

Aspects of the present disclosure further include kits. Kits of interest include a fluidic resistance unit. Fluidic resistance units for use in the subject kits are described above and include a plurality of valves and a plurality of resistors, where each resistor in the plurality of resistors is fluidically coupled to and co-located with a different valve in the plurality of valves. In one embodiment, fluidic resistance units include an inlet for receiving fluid, a valve line fluidically coupled to the inlet, a resistor line fluidically coupled to the inlet, a plurality of connectors fluidically coupling the valve line to the resistor line, and an outlet for emitting fluid.

In addition to the above components, the subject kits may further include (in some embodiments) instructions, e.g., for installing fluidic resistance units of the invention. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

The following example is offered by way of illustration and not by way of limitation.

EXPERIMENTAL

Figures 7A, 7B:
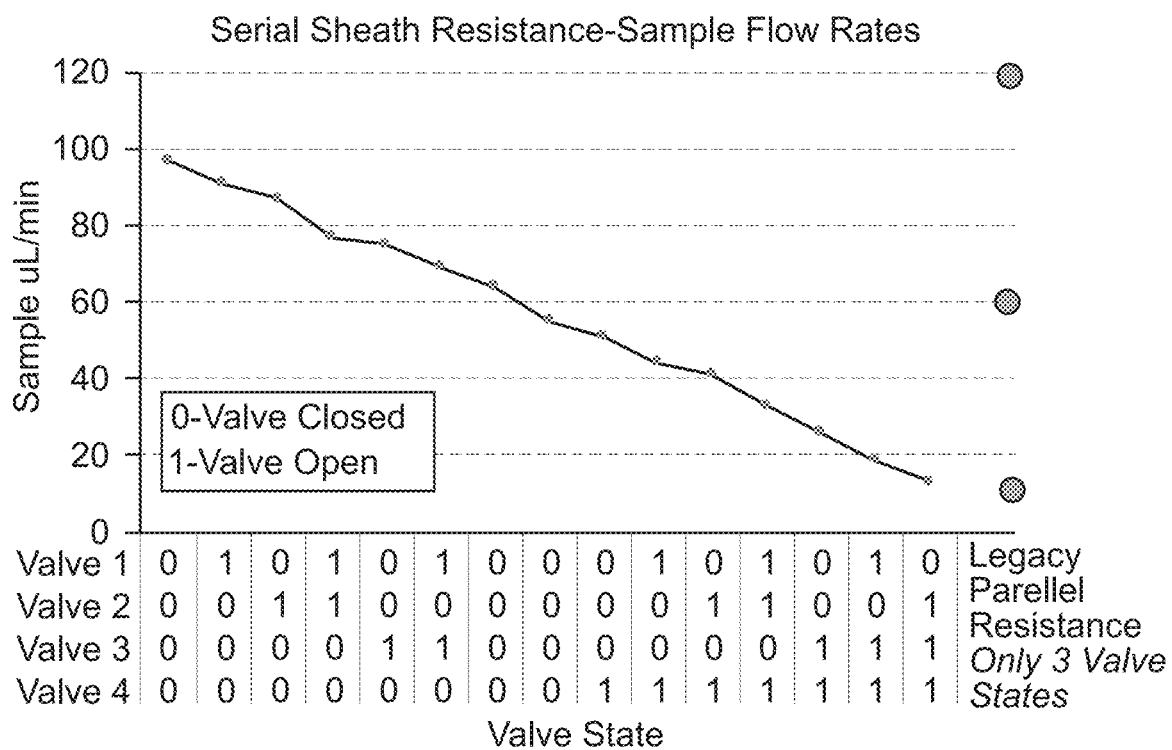
FIG. 7A-7B depict the effect of varying sheath fluid resistance using the subject fluidic resistance units on sample flow rates.

A fluidic resistance unit was constructed according to the series embodiment of FIG. 1A. FIG. 7A depicts the specifications of the constructed fluidic resistance unit. As shown in FIG. 7A, the resistors in the resistor line have had a constant inner diameter of 0.030 inches (0.0762 cm) and successively increasing lengths. Resistor R1 had a length of 2 inches (5.08 cm), resistor R2 had a length of 4 inches (10.16 cm), resistor R3 had a length of 8 inches (20.32 cm), and resistor R4 had a diameter of 16 inches (40.64 cm). The fluidic resistance unit included 4 resistor-valve pairs, and therefore $4^2=16$ resistance states. Fluid was subsequently driven through the fluidic resistance unit at each of the 16 resistance states, in order from the highest level of resistance to the lowest level of resistance. At the highest level of resistance, all valves are closed. In the second highest level of resistance, all valves but V1 are closed. In the third highest level of resistance, all valves but V2 are closed, and so on through all 16 resistance states. Sample fluid flow rates (µl/min) were subsequently measured at each of the 16 resistance states. As shown in FIG. 7B, the highest level of resistance produced the highest flow rate. Flow rates decreased as resistance decreased. As shown at the right-hand side of FIG. 7B, flow rates achieved using previous mechanisms for producing fluidic resistance are added for comparison. The conventional mechanism shown only permits three sample flow rates, while the present fluidic resistance unit permits 16.

Notwithstanding the appended claims, the disclosure is also defined by the following clauses:

1. A flow cytometer comprising:
    a flow cell for transporting particles in a flow stream;
    a sheath fluid line for fluidically coupling to a sheath fluid reservoir; and
    a fluidic resistance unit positioned between the sheath fluid line and the flow cell, wherein the fluidic resistance unit comprises:
       an inlet fluidically coupled to the sheath fluid line;
       a valve line fluidically coupled to the inlet, wherein the valve line comprises a series of fluidically coupled valves;
       a resistor line fluidically coupled to the inlet, wherein the resistor line comprises a series of fluidically coupled resistors;
       a plurality of connectors fluidically coupling the valve line to the resistor line; and
       an outlet fluidically coupling the fluidic resistance unit to the flow cell.
2. The flow cytometer according to Clause 1, wherein the valve line comprises from 2 to 6 valves.
3. The flow cytometer according to Clause 1 or 2, wherein the resistor line comprises from 2 to 6 resistors.
4. The flow cytometer according to any of the preceding clauses, wherein the fluidic resistance unit comprises an equal number of resistors and valves.
5. The flow cytometer according to Clause 4, wherein the fluidic resistance unit comprises $x^2$ resistance states, where x is the number of valves.
6. The flow cytometer according to any of the preceding clauses, wherein each valve of the valve line is individually switchable between an open position in which passage of fluid through the valve is unobstructed and a closed position in which passage of fluid of the valve is obstructed.
7. The flow cytometer according to Clause 6, wherein the passage of fluid through the valve is partially obstructed in the closed position.
8. The flow cytometer according to Clause 6, wherein the passage of fluid through the valve is fully obstructed in the closed position.
9. The flow cytometer according to any of Clauses 6 to 8, further comprising a processor operably connected to each valve of the valve line, wherein the processor is configured to change a resistance state of the fluidic resistance unit by initiating the switching of a valve in the valve line from an open state to a closed state, or vice versa.
10. The flow cytometer according to any of the preceding clauses, wherein each resistor in the resistor line comprises an inner diameter ranging from 0.025 cm to 1.25 cm.
11. The flow cytometer according to Clause 10, wherein the inner diameters of the resistors of the resistor line successively increase.
12. The flow cytometer according to Clause 10, wherein the inner diameters of the resistors of the resistor line are constant.
13. The flow cytometer according to any of the preceding clauses, wherein each resistor of the resistor line has a length ranging from 1.5 cm to 90 cm.
14. The flow cytometer according to Clause 13, wherein the lengths of the resistors of the resistor successively increase.
15. The flow cytometer according to any of the preceding clauses, wherein the number of connectors in the plurality of connectors ranges from 2 to 5.
16. The flow cytometer according to any of the preceding clauses, wherein each connector in the plurality of connectors fluidically couples a portion of the valve line located between two valves in the series of valves to a portion of the resistor line located between two resistors in the series of resistors.
17. The flow cytometer according to any of the preceding clauses, wherein the fluidic resistance unit is comprised of plastic tubing.
18. The flow cytometer according to any of the preceding clauses, wherein the fluidic resistance unit is comprised of metal tubing.
19. The flow cytometer according to any of the preceding clauses, further comprising a light source configured to irradiate the flow cell at an interrogation point.
20. The flow cytometer according to any of the preceding clauses, further comprising a detector configured to collect particle-modulated light from the flow cell.
21. The flow cytometer according to any of the preceding clauses, further comprising a sheath fluid reservoir.
22. A method of analyzing a sample, the method comprising:
   (a) introducing a particulate sample into a flow cytometer comprising:
      a flow cell for transporting particles in a flow stream;
      a sheath fluid line for fluidically coupling to a sheath fluid reservoir; and
      a fluidic resistance unit positioned between the sheath fluid line and the flow cell, wherein the fluidic resistance unit comprises:
         an inlet fluidically coupled to the sheath fluid line;
         a valve line fluidically coupled to the inlet, wherein the valve line comprises a series of fluidically coupled valves;
         a resistor line fluidically coupled to the inlet, wherein the resistor line comprises a series of fluidically coupled resistors;
         a plurality of connectors fluidically coupling the valve line to the resistor line; and
         an outlet fluidically coupling the fluidic resistance unit to the flow cell; and
   (b) flow cytometrically analyzing the sample.
23. The method according to Clause 22, wherein the valve line comprises from 2 to 6 valves.
24. The method according to Clause 22 or 23, wherein the resistor line comprises from 2 to 6 resistors.
25. The method according to any of Clauses 22 or 24, wherein the fluidic resistance unit comprises an equal number of resistors and valves.
26. The method according to Clause 25, wherein the fluidic resistance unit comprises $x^2$ resistance states, where x is the number of valves.
27. The method according to any of Clauses 22 to 26, wherein each valve of the valve line is individually switchable between an open position in which passage of fluid through the valve is unobstructed and a closed position in which passage of fluid of the valve is obstructed.
28. The method according to Clause 27, wherein the passage of fluid through the valve is partially obstructed in the closed position.
29. The method according to Clause 27, wherein the passage of fluid through the valve is fully obstructed in the closed position.
30. The method according to any of Clauses 27 to 29, further comprising changing a resistance state of the fluidic resistance unit by switching a valve of the valve line from an open state to a closed state, or vice versa.
31. The method according to any of Clauses 22 to 30, wherein each resistor of the resistor line comprises an inner diameter ranging from 0.025 cm to 1.25 cm.
32. The method according to Clause 31, wherein the inner diameters of the resistors of the resistor line successively increase.
33. The method according to Clause 31, wherein the inner diameters of the resistors of the resistor line are constant.
34. The method according to any of Clauses 22 to 33, wherein each resistor of the resistor line has a length ranging from 1.5 cm to 90 cm.
35. The method according to Clause 34, wherein the lengths of the resistors of the resistor line successively increase.
36. The method according to any of Clauses 22 to 35, wherein the number of connectors in the plurality of connectors ranges from 2 to 5.
37. The method according to any of Clauses 22 to 36, wherein each connector in the plurality of connectors fluidically couples a portion of the valve line located between two valves in the series of valves to a portion of the resistor line located between two resistors in the series of resistors.
38. The method according to any of Clauses 22 to 37, wherein the fluidic resistance unit is comprised of plastic tubing.
39. The method according to any of Clauses 22 to 38, wherein the fluidic resistance unit is comprised of metal tubing.
40. The method according to any of Clauses 22 to 39, wherein the sample is a biological sample.
41. The method according to any of Clauses 22 to 40, wherein the sample comprises cells.
42. The method according to any of Clauses 22 to 41, wherein the flow cytometer further comprises a sheath fluid reservoir fluidically coupled to the sheath fluid line.
43. A fluidic resistance unit comprising:
   an inlet for receiving fluid;
   a valve line fluidically coupled to the inlet, wherein the valve line comprises a series of fluidically coupled valves;
   a resistor line fluidically coupled to the inlet, wherein the resistor line comprises a series of fluidically coupled resistors;
   a plurality of connectors fluidically coupling the valve line to the resistor line; and
   an outlet for emitting fluid.
44. The fluidic resistance unit according to Clause 43, wherein the valve line comprises from 2 to 6 valves.
45. The fluidic resistance unit according to Clause 44, wherein the valve line comprises 4 valves.
46. The fluidic resistance unit according to any of Clauses 43 to 45, wherein the resistor line comprises from 2 to 6 resistors.
47. The fluidic resistance unit according to Clause 46, wherein the resistor line comprises 4 resistors.
48. The fluidic resistance unit according to any of Clauses 43 to 47, wherein the fluidic resistance unit comprises an equal number of resistors and valves.
49. The fluidic resistance unit according to Clause 48, wherein the fluidic resistance unit comprises $x^2$ resistance states, where x is the number of valves.
50. The fluidic resistance unit according to any of Clauses 43 to 49, wherein each valve of the valve line is individually switchable between an open position in which passage of fluid through the valve is unobstructed and a closed position in which passage of fluid of the valve is obstructed.

51. The fluidic resistance unit according to Clause 50, wherein the passage of fluid through the valve is partially obstructed in the closed position.

52. The fluidic resistance unit according to Clause 50, wherein the passage of fluid through the valve is fully obstructed in the closed position.

53. The fluidic resistance unit according to any of Clauses 43 to 52, wherein each resistor of the resistor line comprises an inner diameter ranging from 0.025 cm to 1.25 cm.

54. The fluidic resistance unit according to Clause 53, wherein the inner diameters of the resistors of the resistor line successively increase.

55. The fluidic resistance unit according to Clause 53, wherein the inner diameters of the resistors of the resistor line are constant.

56. The fluidic resistance unit according to any of Clauses 43 to 55, wherein each resistor of the resistor line has a length ranging from 1.5 cm to 90 cm.

57. The fluidic resistance unit according to Clause 56, wherein the lengths of the resistors of the resistor line successively increase.

58. The fluidic resistance unit according to any of Clauses 43 to 57, wherein the number of connectors in the plurality of connectors ranges from 2 to 5.

59. The fluidic resistance unit according to Clause 58, wherein the fluidic resistance unit comprises 3 connectors.

60. The fluidic resistance unit according to any of Clauses 43 to 59, wherein each connector in the plurality of connectors fluidically couples a portion of the valve line located between two valves in the series of valves to a portion of the resistor line located between two resistors in the series of resistors.

61. The fluidic resistance unit according to any of Clauses 43 to 60, wherein the fluidic resistance unit is comprised of plastic tubing.

62. The fluidic resistance unit according to any of Clauses 43 to 61, wherein the fluidic resistance unit is comprised of metal tubing.

63. A method of assembling a flow cytometer, the method comprising fluidically coupling a fluidic resistance unit to:
a flow cell for transporting particles in a flow stream; and
a sheath fluid line for fluidically coupling to a sheath fluid reservoir, wherein the fluidic resistance unit comprises:
an inlet for receiving fluid;
a valve line fluidically coupled to the inlet, wherein the valve line comprises a series of fluidically coupled valves;
a resistor line fluidically coupled to the inlet, wherein the resistor line comprises a series of fluidically coupled resistors;
a plurality of connectors fluidically coupling the valve line to the resistor line; and
an outlet for emitting fluid.

64. The method according to Clause 63, wherein the valve line comprises from 2 to 6 valves.

The method according to Clause 63 or 64, wherein the resistor line comprises from 2 to 6 resistors.

66. The method according to any of Clauses 63 or 65, wherein the fluidic resistance unit comprises an equal number of resistors and valves.

67. The method according to Clause 66, wherein the fluidic resistance unit comprises $x^2$ resistance states, where x is the number of valves.

68. The method according to any of Clauses 63 to 67, wherein each valve of the valve line is individually switchable between an open position in which passage of fluid through the valve is unobstructed and a closed position in which passage of fluid of the valve is obstructed.

69. The method according to Clause 68, wherein the passage of fluid through the valve is partially obstructed in the closed position.

70. The method according to Clause 68, wherein the passage of fluid through the valve is fully obstructed in the closed position.

71. The method according to any of Clauses 68 to 70, further comprising operably connecting a processor to each valve of the valve line, wherein the processor is configured to change a resistance state of the fluidic resistance unit by initiating the switching of a valve in the valve line from an open state to a closed state, or vice versa.

72. The method according to any of Clauses 63 to 71, wherein each resistor of the resistor line comprises an inner diameter ranging from 0.025 cm to 1.25 cm.

73. The method according to Clause 72, wherein the inner diameters of the resistors of the resistor line successively increase.

74. The method according to Clause 72, wherein the inner diameters of the resistors of the resistor line are constant.

75. The method according to any of Clauses 63 to 74, wherein each resistor of the resistor line has a length ranging from 1.5 cm to 90 cm.

76. The method according to Clause 75, wherein the lengths of the resistors of the resistor line successively increase.

77. The method according to any of Clauses 63 to 76, wherein the number of connectors in the plurality of connectors ranges from 2 to 5.

78. The method according to any of Clauses 63 to 77, wherein each connector in the plurality of connectors fluidically couples a portion of the valve line located between two valves in the series of valves to a portion of the resistor line located between two resistors in the series of resistors.

79. The method according to any of Clauses 63 to 78, wherein the fluidic resistance unit is comprised of plastic tubing.

80. The method according to any of Clauses 63 to 79, wherein the fluidic resistance unit is comprised of metal tubing.

81. The method according to any of Clauses 63 to 80, further comprising fluidically connecting a sheath fluid reservoir to the sheath fluid line.

82. A fluidic resistance unit comprising:
a plurality of valves; and
a plurality of resistors, wherein each resistor in the plurality of resistors is fluidically coupled to and co-located with a different valve in the plurality of valves.

83. The fluidic resistance unit according to Clause 82, wherein the fluidic resistance unit comprises from 2 to 6 valves.

84. The fluidic resistance unit according to Clause 83, wherein the fluidic resistance unit comprises 4 valves.

85. The fluidic resistance unit according to any of Clauses 82 to 84, wherein the fluidic resistance unit comprises from 2 to 6 resistors.

86. The fluidic resistance unit according to Clause 85, wherein the fluidic resistance unit comprises 4 resistors.

87. The fluidic resistance unit according to any of Clauses 82 to 86, wherein the fluidic resistance unit comprises an equal number of resistors and valves.

88. The fluidic resistance unit according to Clause 87, wherein the fluidic resistance unit comprises $x^2$ resistance states, where x is the number of valves.

89. The fluidic resistance unit according to any of Clauses 82 to 88, wherein each valve in the plurality of valves is individually switchable between an open position in which passage of fluid through the valve is unobstructed and a closed position in which passage of fluid of the valve is obstructed.

90. The fluidic resistance unit according to Clause 89, wherein the passage of fluid through the valve is partially obstructed in the closed position.

91. The fluidic resistance unit according to Clause 89, wherein the passage of fluid through the valve is fully obstructed in the closed position.

92. The fluidic resistance unit according to any of Clauses 82 to 91, wherein each resistor of the resistor line comprises an inner diameter ranging from 0.025 cm to 1.25 cm.

93. The fluidic resistance unit according to Clause 92, wherein the inner diameters of the resistors of the resistor line are constant.

94. The fluidic resistance unit according to any of Clauses 82 to 93, wherein each resistor of the resistor line has a length ranging from 1.5 cm to 90 cm.

95. The fluidic resistance unit according to any of Clauses 82 to 94, wherein the fluidic resistance unit is comprised of plastic tubing.

96. The fluidic resistance unit according to any of Clauses 82 to 94, wherein the fluidic resistance unit is comprised of metal tubing.

Although the foregoing invention has been described in some detail by way of illustration and example for purposes of clarity of understanding, it is readily apparent to those of ordinary skill in the art in light of the teachings of this invention that some changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A flow cytometer comprising:
   a flow cell for transporting particles in a flow stream;
   a sheath fluid line for fluidically coupling to a sheath fluid reservoir; and
   a fluidic resistance unit positioned between the sheath fluid line and the flow cell, wherein the fluidic resistance unit comprises:
      an inlet fluidically coupled to the sheath fluid line;
      a valve line fluidically coupled to the inlet, wherein the valve line comprises a series of fluidically coupled valves;
      a resistor line fluidically coupled to the inlet, wherein the resistor line comprises a series of fluidically coupled resistors;
      a plurality of connectors fluidically coupling the valve line to the resistor line; and
      an outlet fluidically coupling the fluidic resistance unit to the flow cell.

2. The flow cytometer according to claim 1, wherein the valve line comprises from 2 to 6 valves.

3. The flow cytometer according to claim 1, wherein the resistor line comprises from 2 to 6 resistors.

4. The flow cytometer according to claim 1, wherein the fluidic resistance unit comprises an equal number of resistors and valves.

5. The flow cytometer according to claim 4, wherein the fluidic resistance unit comprises $x^2$ resistance states, where x is the number of valves.

6. The flow cytometer according to claim 1, wherein each valve of the valve line is individually switchable between an open position in which passage of fluid through the valve is unobstructed and a closed position in which passage of fluid of the valve is obstructed.

7. The flow cytometer according to claim 6, wherein the passage of fluid through the valve is partially obstructed in the closed position.

8. The flow cytometer according to claim 6, wherein the passage of fluid through the valve is fully obstructed in the closed position.

9. The flow cytometer according to claim 6, further comprising a processor operably connected to each valve of the valve line, wherein the processor is configured to change a resistance state of the fluidic resistance unit by initiating the switching of a valve in the valve line from an open state to a closed state, or vice versa.

10. The flow cytometer according to claim 1, wherein the inner diameters of the resistors of the resistor line successively increase.

11. The flow cytometer according to claim 1, wherein the inner diameters of the resistors of the resistor line are constant.

12. The flow cytometer according to claim 1, wherein each resistor of the resistor line has a length ranging from 1.5 cm to 90 cm.

13. The flow cytometer according to claim 12, wherein the lengths of the resistors of the resistor successively increase.

14. The flow cytometer according to claim 1, wherein the number of connectors in the plurality of connectors ranges from 2 to 5.

15. The flow cytometer according to claim 1, wherein each connector in the plurality of connectors fluidically couples a portion of the valve line located between two valves in the series of valves to a portion of the resistor line located between two resistors in the series of resistors.

16. The flow cytometer according to claim 1, wherein the fluidic resistance unit is comprised of plastic tubing.

17. The flow cytometer according to claim 1, wherein the fluidic resistance unit is comprised of metal tubing.

18. The flow cytometer according to claim 1, further comprising a light source configured to irradiate the flow cell at an interrogation point.

19. The flow cytometer according to claim 1, further comprising a detector configured to collect particle-modulated light from the flow cell.

20. The flow cytometer according to claim 1, further comprising a sheath fluid reservoir.

* * * * *